US012758881B2

(12) United States Patent
Matsuura

(10) Patent No.: US 12,758,881 B2
(45) Date of Patent: Oct. 13, 2026

(54) ONE OR MORE NON-TRANSITORY COMPUTER-READABLE STORAGE MEDIA HAVING PROGRAMS STORED THEREIN, GAME PROCESSING SYSTEM, AND GAME PROCESSING METHOD

(71) Applicant: NINTENDO CO., LTD., Kyoto (JP)

(72) Inventor: Ryuhei Matsuura, Kyoto (JP)

(73) Assignee: NINTENDO CO., LTD., Kyoto (JP)

( * ) Notice: Subject to any disclaimer, the term of this patent is extended or adjusted under 35 U.S.C. 154(b) by 156 days.

(21) Appl. No.: 18/792,019

(22) Filed: Aug. 1, 2024

(65) Prior Publication Data

US 2025/0041735 A1 Feb. 6, 2025

(30) Foreign Application Priority Data

Aug. 2, 2023 (JP) ................................ 2023-126361

(51) Int. Cl.

| | |
|---|---|
| ***A63F 13/69*** | (2014.01) |
| ***A63F 13/48*** | (2014.01) |
| ***A63F 13/49*** | (2014.01) |
| ***A63F 13/55*** | (2014.01) |
| ***A63F 13/795*** | (2014.01) |

(52) U.S. Cl.

CPC .............. *A63F 13/69* (2014.09); *A63F 13/48* (2014.09); *A63F 13/49* (2014.09); *A63F 13/55* (2014.09); *A63F 13/795* (2014.09)

(58) Field of Classification Search

CPC .......... A63F 13/69; A63F 13/48; A63F 13/49; A63F 13/55; A63F 13/795; A63F 13/35; A63F 13/84

See application file for complete search history.

(56) References Cited

U.S. PATENT DOCUMENTS

| | | | | |
|---|---|---|---|---|
| 10,456,680 B2 * | 10/2019 | Miron | A63F 13/822 | |
| 10,974,150 B2 * | 4/2021 | Reiche, III | A63F 13/69 | |
| 11,213,754 B2 * | 1/2022 | Hodge | A63F 13/73 | |
| 2007/0015575 A1 * | 1/2007 | Matsuno | A63F 13/00 | 463/30 |
| 2007/0213107 A1 * | 9/2007 | Itou | A63F 13/56 | 463/1 |
| 2011/0295120 A1 | 12/2011 | Lee | | |
| 2012/0309522 A1 | 12/2012 | Westlund et al. | | |

(Continued)

FOREIGN PATENT DOCUMENTS

| | | |
|---|---|---|
| JP | 2000-237451 | 9/2000 |
| JP | 2011-251114 | 12/2011 |

(Continued)

OTHER PUBLICATIONS

"New Super Mario Bros. Wii". Jun. 24, 2022. <https://www.mariowiki.com/index.php?title=New_Super_Mario_Bros._Wii&oldid=3696828> Accessed Mar. 3, 2026 (Year: 2022).*

(Continued)

*Primary Examiner* — Seng H Lim
(74) *Attorney, Agent, or Firm* — Nixon & Vanderhye, PC

(57) ABSTRACT

In a game stage, if a second player character acts on a trigger object within a predetermined time after a first player character acts on the trigger object, the game is advanced in a mode in which a user of a first game apparatus and a user of a second game apparatus compete for a play result of a multiplayer game in the game stage.

23 Claims, 16 Drawing Sheets

RACE STARTS (SCREEN OF A)

(56) References Cited

U.S. PATENT DOCUMENTS

| | | | | |
|---|---|---|---|---|
| 2019/0046883 | A1* | 2/2019 | Hodge | A63F 13/35 |
| 2019/0091575 | A1* | 3/2019 | Reiche, III | A63F 13/798 |
| 2020/0246698 | A1* | 8/2020 | Oshino | A63F 13/35 |
| 2023/0086441 | A1* | 3/2023 | Wang | A63F 13/803<br>463/6 |
| 2023/0321535 | A1 | 10/2023 | Xie | |
| 2024/0157238 | A1* | 5/2024 | Fukuda | A63F 13/537 |
| 2025/0073591 | A1* | 3/2025 | Polney | A63F 13/44 |

FOREIGN PATENT DOCUMENTS

| | | |
|---|---|---|
| JP | 2013-178727 | 9/2013 |
| JP | 2019-122561 | 7/2019 |
| JP | 2020124286 A | 8/2020 |
| JP | 2022-155070 | 10/2022 |
| WO | 2023/071739 | 5/2023 |

OTHER PUBLICATIONS

"Goal Pole". May 29, 2022. < https://www.mariowiki.com/index.php?title=Goal_Pole&oldid=3680340> Accessed Mar. 3, 2026 (Year: 2022).*

"Goal Pole". Jun. 25, 2022. <https://web.archive.org/web/20220625230932/https://mario.fandom.com/wiki/Goal_Pole> Accessed Mar. 3, 2026 (Year: 2022).*

Oct. 8, 2024 Office Action issued in Japanese Patent Application No. 2023-126361, pp. 1-15 [machine translation included].

Nov. 25, 2025 Office Action issued in Japanese Patent Application No. 2025-009571, pp. 1-7 [English translation included].

* cited by examiner

STAGE SELECTION SCREEN

ENTER STAGE (SCREEN OF A)

B INVITES MEMBERS TO PARTICIPATE IN RACE AND ENTERS RACE (SCREEN OF A)

SCREEN IS SCROLLABLE (SCREEN OF A)

WHEN C WHO HAS NOT ENTERED HITS RACE BLOCK AFTER COUNTDOWN FOR RACE ENDS (SCREEN OF C)

FINISH (SCREEN OF A)

WAITING STATE AFTER REACHING GOAL (SCREEN OF A)

ONE OR MORE NON-TRANSITORY COMPUTER-READABLE STORAGE MEDIA HAVING PROGRAMS STORED THEREIN, GAME PROCESSING SYSTEM, AND GAME PROCESSING METHOD

CROSS REFERENCE TO RELATED APPLICATION

This application claims priority to Japanese Patent Application No. 2023-126361 filed on Aug. 2, 2023, the entire contents of which are incorporated herein by reference.

FIELD

The present disclosure relates to information processing for games, etc.

BACKGROUND AND SUMMARY

Hitherto, there have been multiplayer games in which a game stage is played by multiple players.

In multiplayer games, there has been a demand for selection of a play mode with a higher degree of freedom.

Therefore, it is an object of the exemplary embodiments to provide one or more non-transitory computer-readable storage media having programs stored therein, a game processing system, and a game processing method that enable selection of a play mode with a higher degree of freedom in a multiplayer game.

In order to attain the object described above, for example, the following configuration examples are exemplified.

A first configuration example is directed to one or more non-transitory computer-readable storage media having stored therein programs that, when executed by a processor of a first game apparatus for performing a multiplayer game between the first game apparatus and a second game apparatus capable of communicating with the first game apparatus, cause the first game apparatus to perform operations comprising: placing a first player character controlled to move based on operation data by a user of the first game apparatus, a second player character controlled to move based on operation data by a user of the second game apparatus, and a predetermined trigger object in a game stage; starting a multiplayer game with the first player character and the second player character in the game stage; if the second player character acts on the trigger object within a first time after the first player character acts on the trigger object, advancing the game in a first mode in which the user of the first game apparatus and the second game apparatus compete for a play result of the multiplayer game in the game stage; and if the second player character does not act on the trigger object within the first time after the first player character acts on the trigger object placed in the game stage, advancing the game in a second mode in which the user of the first game apparatus and the user of the second game apparatus do not compete for a play result of the multiplayer game in the game stage.

According to the above first configuration example, in the multiplayer game, each player can be allowed to select a play mode by operating the player character after the game stage starts.

In a second configuration example based on the first configuration example, the programs cause the first game apparatus to perform the operations comprising: further placing, in the game stage, a third player character controlled to move based on operation data by a user of a third game apparatus matched with the first game apparatus and the second game apparatus via a network; causing a player character acting on the trigger object within the first time to play in the first mode; and causing a player character not acting on the trigger object within the first time to play in the second mode.

In a third configuration example based on the first or second configuration example, the programs cause the first game apparatus to perform the operations comprising causing a player character acting on the trigger object to be unable to move out of a predetermined region in the game stage until the first time elapses.

According to the above third configuration example, in the first mode of competing for a play result, it is possible to prevent the player character from starting moving at an earlier timing than the other player characters to advantageously advance the game, thereby ensuring fairness in the first mode of competing for a play result.

In a fourth configuration example based on the third configuration example, the programs cause the first game apparatus to perform the operations comprising causing the player character acting on the trigger object to be unable to move out of the predetermined region by locking scrolling display of a screen of the game stage.

According to the above fourth configuration example, an uncomfortable feeling caused by restricting the movement of the player character can be reduced.

In a fifth configuration example based on the first configuration example, the programs cause the first game apparatus to perform the operations comprising, after any player character clears the game stage in the first mode and then a second time elapses, ending the first mode even if another player character has not cleared the game stage.

According to the above fifth configuration example, the first mode can be ended without waiting for a player character that is far behind in clearing the game stage.

In a sixth configuration example based on the fifth configuration example, the programs cause the first game apparatus to perform the operations comprising causing the user of the player character which has not cleared the game stage when the first mode is ended to select whether to continue to play the game in the second mode or end playing the game.

According to the above sixth configuration example, a user for which the first mode of competing for a play result is ended can be provided with an option of continuing the game in the second mode of not competing for a play result.

In a seventh configuration example based on the first configuration example, the matching includes friend matching performed between users who are friends with each other and random matching performed between random users, and the programs cause the first game apparatus to perform the operations comprising placing the trigger object in the game stage only when the multiplayer game is played by users matched by the friend matching.

According to the above seventh configuration example, the game can be played in the first mode only by users who are friends with each other.

According to the exemplary embodiment, it is possible to provide one or more non-transitory computer-readable storage media having programs stored therein, a game processing system, and a game processing method that enable selection of a play mode with a higher degree of freedom in a multiplayer game.

DETAILED DESCRIPTION OF NON-LIMITING EXAMPLE EMBODIMENTS

Hereinafter, an exemplary embodiment will be described.

[Hardware Configuration of Information Processing System]

Hereinafter, an information processing system (game system, game apparatus) according to an example of the exemplary embodiment will be described below. An example of a game system 1 according to the exemplary embodiment includes a main body apparatus (an information processing apparatus, which functions as a game apparatus main body in the exemplary embodiment) 2, a left controller 3, and a right controller 4. Each of the left controller 3 and the right controller 4 is attachable to and detachable from the main body apparatus 2. That is, the game system 1 can be used as a unified apparatus obtained by attaching each of the left controller 3 and the right controller 4 to the main body apparatus 2. Further, in the game system 1, the main body apparatus 2, the left controller 3, and the right controller 4 can also be used as separate bodies. Hereinafter, first, the hardware configuration of the game system 1 according to the exemplary embodiment will be described, and then, the control of the game system 1 according to the exemplary embodiment will be described.

Figure 1:
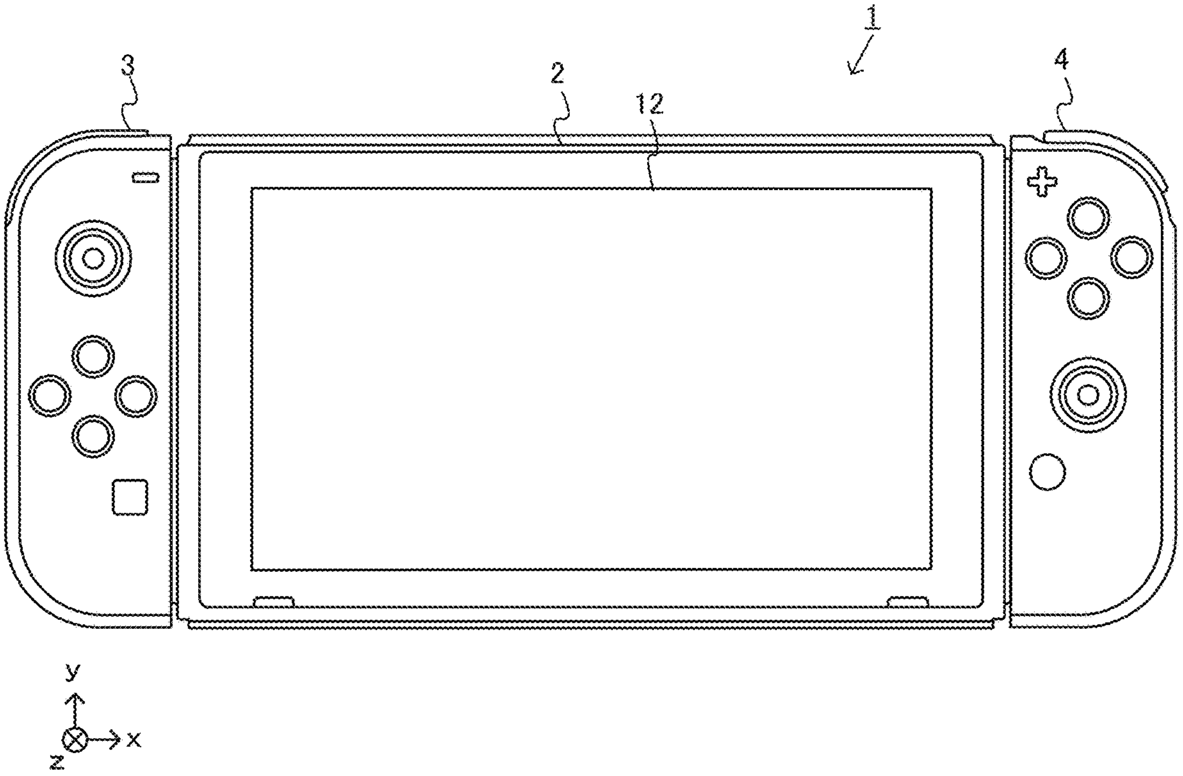
FIG. 1 shows a non-limiting example of a state where a left controller 3 and a right controller 4 are attached to a main body apparatus 2.

FIG. 1 shows an example of the state where the left controller 3 and the right controller 4 are attached to the main body apparatus 2. As shown in FIG. 1, each of the left controller 3 and the right controller 4 is attached to and unified with the main body apparatus 2. The main body apparatus 2 is an apparatus for performing various processes in the game system 1. The main body apparatus 2 includes a display 12. Each of the left controller 3 and the right controller 4 is an apparatus including operation sections with which a user provides inputs.

The main body apparatus 2 also includes speakers 88, and sounds such as sound effects are outputted from the speakers 88.

The main body apparatus 2 also includes a left terminal 17 for the main body apparatus 2 to perform wired communication with the left controller 3, and a right terminal 21 for the main body apparatus 2 to perform wired communication with the right controller 4.

The main body apparatus 2 also includes a slot 23. The slot 23 is provided on an upper side surface of a housing of the main body apparatus 2. The slot 23 is so shaped as to allow a predetermined type of storage medium to be attached to the slot 23. The predetermined type of storage medium is, for example, a dedicated storage medium (e.g., a dedicated memory card) for the game system 1 and an information processing apparatus of the same type as the game system 1. The predetermined type of storage medium is used to store, for example, data (e.g., saved data of an application or the like) used by the main body apparatus 2 and/or a program (e.g., a program for an application or the like) executed by the main body apparatus 2. Further, the main body apparatus 2 includes a power button 28.

Each of the left controller 3 and the right controller 4 includes various operation buttons, etc. The various operation buttons, etc., are used to give instructions according to various programs (e.g., an OS program and an application program) executed by the main body apparatus 2.

Each of the left controller 3 and the right controller 4 also includes a terminal 42 or 64 for performing wired communication with the main body apparatus 2.

Figure 2:
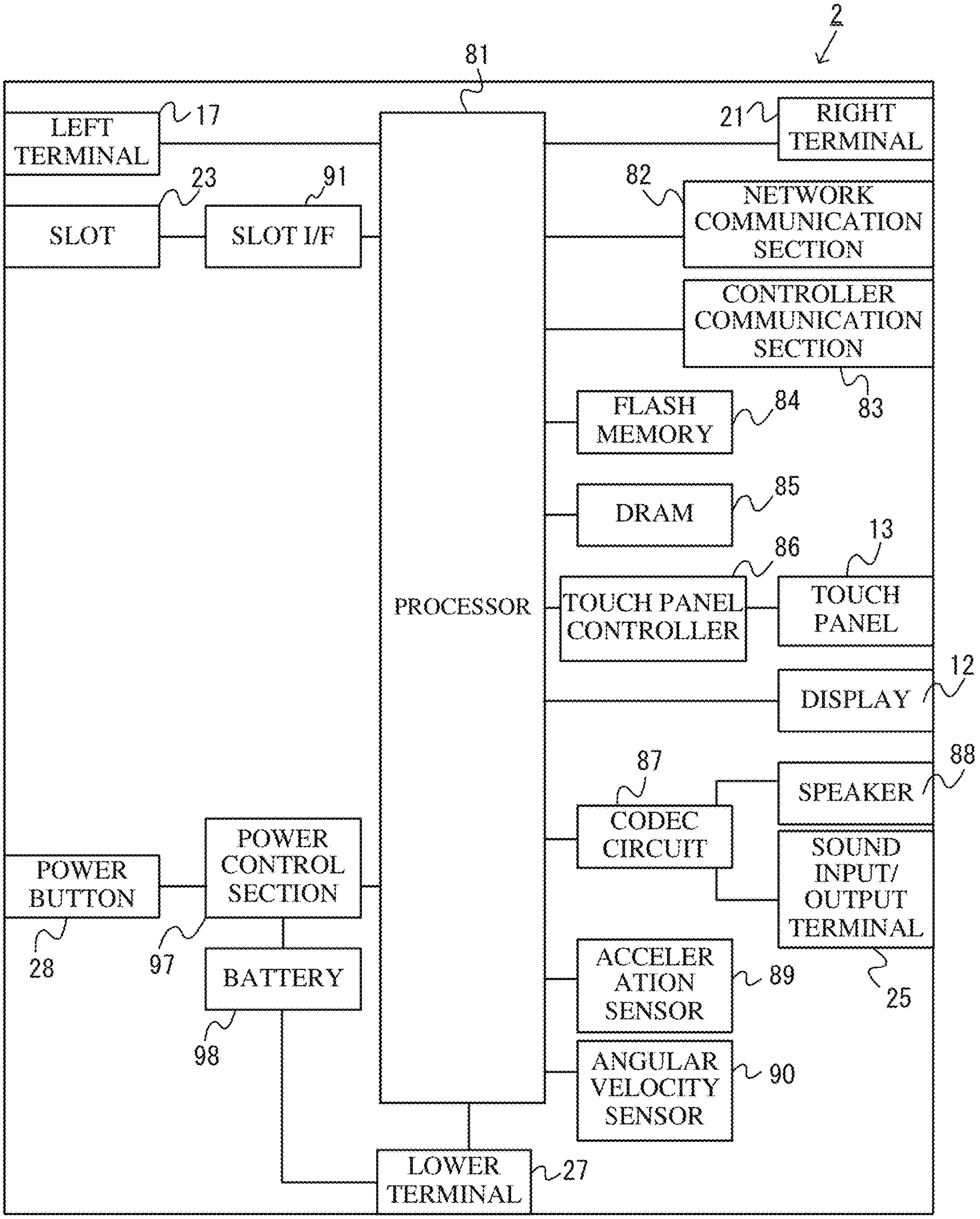
FIG. 2 is a block diagram showing a non-limiting example of the internal configuration of the main body apparatus 2.

FIG. 2 is a block diagram showing an example of the internal configuration of the main body apparatus 2. The main body apparatus 2 includes a processor 81. The processor 81 is an information processing section for executing various types of information processing to be executed by the main body apparatus 2. For example, the processor 81 may be composed only of a CPU (Central Processing Unit), or may be composed of a SoC (System-on-a-chip) having a plurality of functions such as a CPU function and a GPU (Graphics Processing Unit) function. The processor 81 executes an information processing program (e.g., a game program) stored in a storage section (specifically, an internal storage medium such as a flash memory 84, an external storage medium attached to the slot 23, or the like), thereby performing the various types of information processing.

The main body apparatus 2 includes the flash memory 84 and a DRAM (Dynamic Random Access Memory) 85 as examples of internal storage media built into the main body apparatus 2. The flash memory 84 and the DRAM 85 are connected to the processor 81. The flash memory 84 is a memory mainly used to store various data (or programs) to be saved in the main body apparatus 2. The DRAM 85 is a memory used to temporarily store various data used for information processing.

The main body apparatus 2 includes a slot interface (hereinafter, abbreviated as "I/F") 91. The slot I/F 91 is connected to the processor 81. The slot I/F 91 is connected to the slot 23, and in accordance with an instruction from the processor 81, reads and writes data from and to the predetermined type of storage medium (e.g., a dedicated memory card) attached to the slot 23.

The processor 81 appropriately reads and writes data from and to the flash memory 84, the DRAM 85, and each of the above storage media, thereby performing the above information processing.

The main body apparatus 2 includes a network communication section 82. The network communication section 82 is connected to the processor 81. The network communication section 82 communicates (specifically, through wireless communication) with an external apparatus via a network. In the exemplary embodiment, the network communication section 82 connects to a wireless LAN by a method compliant with the Wi-Fi standard, for example, and performs Internet communication or the like with an external apparatus (another main body apparatus 2). Further, the network communication section 82 can also perform short-range wireless communication (e.g., infrared light communication) with another main body apparatus 2.

The main body apparatus 2 includes a controller communication section 83. The controller communication section 83 is connected to the processor 81. The controller communication section 83 wirelessly communicates with the left controller 3 and/or the right controller 4. The communication method between the main body apparatus 2 and the left controller 3 and the right controller 4 is discretionary. In the exemplary embodiment, the controller communication section 83 performs communication compliant with the Bluetooth (registered trademark) standard with the left controller 3 and with the right controller 4.

The processor 81 is connected to the above left terminal 17, the above right terminal 21, and a lower terminal 27. When performing wired communication with the left controller 3, the processor 81 transmits data to the left controller 3 via the left terminal 17 and also receives operation data from the left controller 3 via the left terminal 17. Further, when performing wired communication with the right controller 4, the processor 81 transmits data to the right controller 4 via the right terminal 21 and also receives operation data from the right controller 4 via the right terminal 21. Further, when communicating with a cradle, the processor 81 transmits data to the cradle via the lower terminal 27. As described above, in the exemplary embodiment, the main body apparatus 2 can perform both wired communication and wireless communication with each of the left controller 3 and the right controller 4. Further, when the unified apparatus obtained by attaching the left controller 3 and the right controller 4 to the main body apparatus 2 or the main body apparatus 2 alone is attached to the cradle, the main body apparatus 2 can output data (e.g., image data or sound data) to the stationary monitor or the like via the cradle.

The main body apparatus 2 includes a touch panel controller 86, which is a circuit for controlling a touch panel 13. The touch panel controller 86 is connected between the touch panel 13 and the processor 81. On the basis of a signal from the touch panel 13, the touch panel controller 86 generates data indicating the position at which a touch input has been performed, for example, and outputs the data to the processor 81.

Further, the display 12 is connected to the processor 81. The processor 81 displays a generated image (e.g., an image generated by executing the above information processing) and/or an externally acquired image on the display 12.

The main body apparatus 2 includes a codec circuit 87 and the speakers (specifically, a left speaker and a right speaker) 88. The codec circuit 87 is connected to the speakers 88 and a sound input/output terminal 25 and also connected to the processor 81. The codec circuit 87 is a circuit for controlling the input and output of sound data to and from the speakers 88 and the sound input/output terminal 25.

The main body apparatus 2 includes a power control section 97 and a battery 98. The power control section 97 is connected to the battery 98 and the processor 81. Further, although not shown in FIG. 2, the power control section 97 is connected to components of the main body apparatus 2 (specifically, components that receive power supplied from the battery 98, the left terminal 17, and the right terminal 21). On the basis of a command from the processor 81, the power control section 97 controls the supply of power from the battery 98 to the above components.

Further, the battery 98 is connected to the lower terminal 27. When an external charging device (e.g., the cradle) is connected to the lower terminal 27, and power is supplied to the main body apparatus 2 via the lower terminal 27, the battery 98 is charged with the supplied power.

Figure 3:
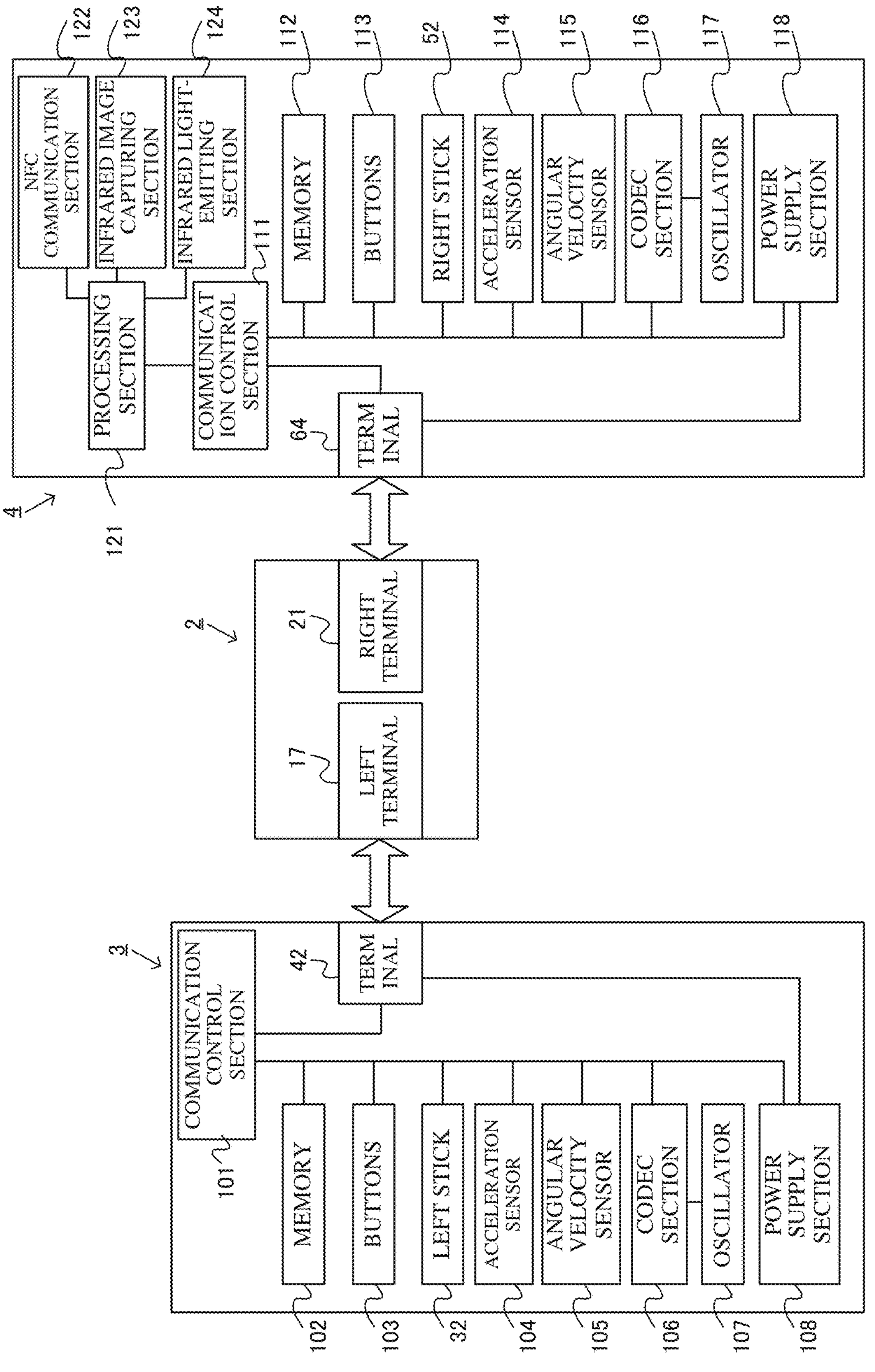
FIG. 3 is a block diagram showing a non-limiting example of the internal configurations of the main body apparatus 2, the left controller 3, and the right controller 4.

FIG. 3 is a block diagram showing examples of the internal configurations of the main body apparatus 2, the left controller 3, and the right controller 4. It should be noted that the details of the internal configuration of the main body apparatus 2 are shown in FIG. 2 and therefore are omitted in FIG. 3.

Figure 7:
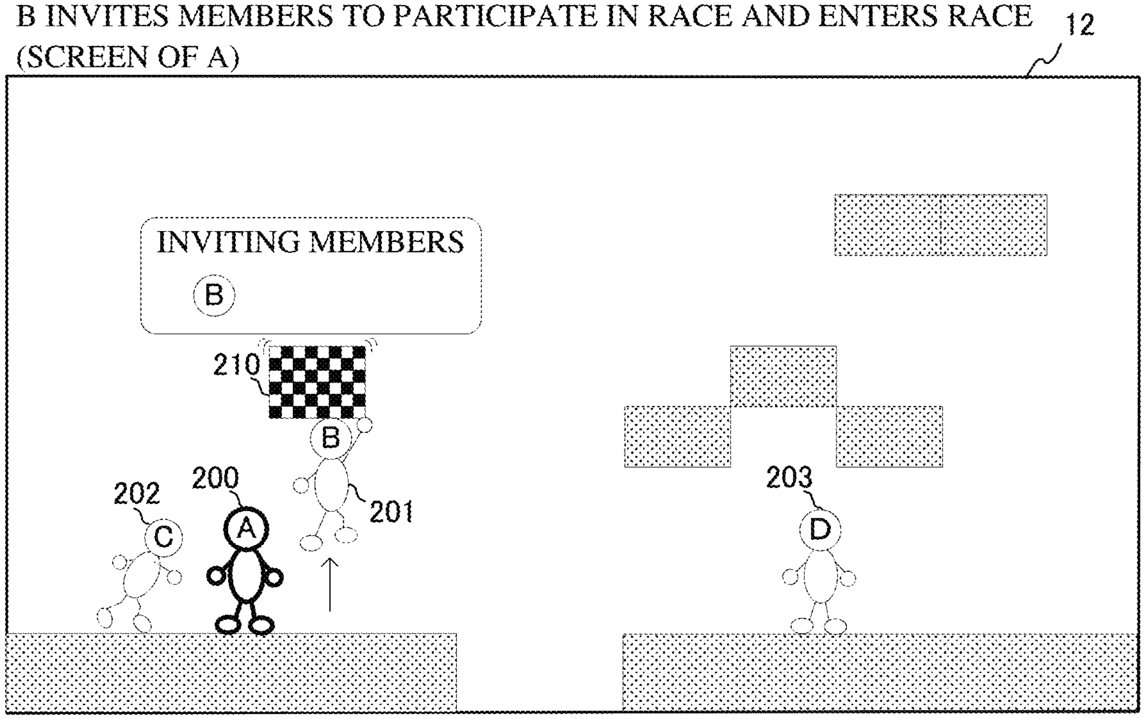
FIG. 7 illustrates a non-limiting example of the game screen.

The left controller 3 includes a communication control section 101, which communicates with the main body apparatus 2. As shown in FIG. 7, the communication control section 101 is connected to components including the terminal 42. In the exemplary embodiment, the communication control section 101 can communicate with the main body apparatus 2 through both wired communication via the terminal 42 and wireless communication not via the terminal 42. The communication control section 101 controls the method for communication performed by the left controller 3 with the main body apparatus 2. That is, when the left controller 3 is attached to the main body apparatus 2, the communication control section 101 communicates with the main body apparatus 2 via the terminal 42. Further, when the left controller 3 is detached from the main body apparatus 2, the communication control section 101 wirelessly communicates with the main body apparatus 2 (specifically, the controller communication section 83). The wireless communication between the communication control section 101 and the controller communication section 83 is performed in accordance with the Bluetooth (registered trademark) standard, for example.

The left controller 3 also includes a memory 102 such as a flash memory. The communication control section 101 includes, for example, a microcomputer (or a microprocessor) and executes firmware stored in the memory 102, thereby performing various processes.

The left controller 3 includes buttons 103 (specifically, buttons 33 to 39, 43, 44, and 47). The left controller 3 also includes a left stick 32. Each of the buttons 103 and the left stick 32 outputs information regarding an operation performed on itself to the communication control section 101 repeatedly at appropriate timings.

The left controller 3 includes inertial sensors. Specifically, the left controller 3 includes an acceleration sensor 104. Further, the left controller 3 includes an angular velocity sensor 105. In the exemplary embodiment, the acceleration sensor 104 detects the magnitudes of accelerations along predetermined three axial (e.g., xyz axes shown in FIG. 4) directions. It should be noted that the acceleration sensor 104 may detect an acceleration along one axial direction or accelerations along two axial directions. In the exemplary embodiment, the angular velocity sensor 105 detects angular velocities about predetermined three axes (e.g., the xyz axes shown in FIG. 4). It should be noted that the angular velocity sensor 105 may detect an angular velocity about one axis or angular velocities about two axes. Each of the acceleration sensor 104 and the angular velocity sensor 105 is connected to the communication control section 101. Then, the detection results of the acceleration sensor 104 and the angular velocity sensor 105 are outputted to the communication control section 101 repeatedly at appropriate timings.

The communication control section 101 acquires information regarding an input (specifically, information regarding an operation, or the detection result of the sensor) from each of input sections (specifically, the buttons 103, the left stick 32, and the sensors 104 and 105). The communication control section 101 transmits operation data including the acquired information (or information obtained by performing predetermined processing on the acquired information) to the main body apparatus 2. It should be noted that the operation data is transmitted repeatedly, once every predetermined time. It should be noted that the interval at which the information regarding an input is transmitted from each of the input sections to the main body apparatus 2 may or may not be the same.

The above operation data is transmitted to the main body apparatus 2, whereby the main body apparatus 2 can obtain inputs provided to the left controller 3. That is, the main body apparatus 2 can determine operations on the buttons 103 and the left stick 32 on the basis of the operation data. Further, the main body apparatus 2 can calculate information regarding the motion and/or the orientation of the left controller 3 on the basis of the operation data (specifically, the detection results of the acceleration sensor 104 and the angular velocity sensor 105).

The left controller 3 includes a power supply section 108. In the exemplary embodiment, the power supply section 108 includes a battery and a power control circuit. Although not shown in FIG. 7, the power control circuit is connected to the battery and also connected to components of the left controller 3 (specifically, components that receive power supplied from the battery).

As shown in FIG. 3, the right controller 4 includes a communication control section 111, which communicates with the main body apparatus 2. The right controller 4 also includes a memory 112 which is connected to the communication control section 111. The communication control section 111 is connected to components including the terminal 64. The communication control section 111 and the memory 112 have functions similar to those of the communication control section 101 and the memory 102, respectively, of the left controller 3. Thus, the communication control section 111 can communicate with the main body apparatus 2 through both wired communication via the terminal 64 and wireless communication not via the terminal 64 (specifically, communication compliant with the Bluetooth (registered trademark) standard). The communication control section 111 controls the method for communication performed by the right controller 4 with the main body apparatus 2.

The right controller 4 includes input sections similar to the input sections of the left controller 3. Specifically, the right controller 4 includes buttons 113, a right stick 52, and inertial sensors (an acceleration sensor 114 and an angular velocity sensor 115). These input sections have functions similar to those of the input sections of the left controller 3 and operate similarly to the input sections of the left controller 3.

The right controller 4 includes a power supply section 118. The power supply section 118 has a function similar to that of the power supply section 108 of the left controller 3 and operates similarly to the power supply section 108.

[Game Assumed in Exemplary Embodiment]

Next, an outline of game processing (an example of the information processing) executed in the game system 1 according to the exemplary embodiment will be described. A game assumed in the exemplary embodiment is, for example, an action game in which a player object (sometimes referred to as "player character") which performs actions in accordance with operations performed by a player (user) moves and performs other actions in a virtual space (game space) in which various objects are placed, to achieve a predetermined objective (objective to reach a goal point). Specifically, the game is an action game in which a player selects a stage to play from a plurality of game stages (sometimes simply referred to as "stages"), and if a plurality of players select the same stage, the players perform multiplay in the selected stage. This game is not limited to the action game, and may be other types of games.

[Outline of Game Processing of Exemplary Embodiment]

Figure 4:
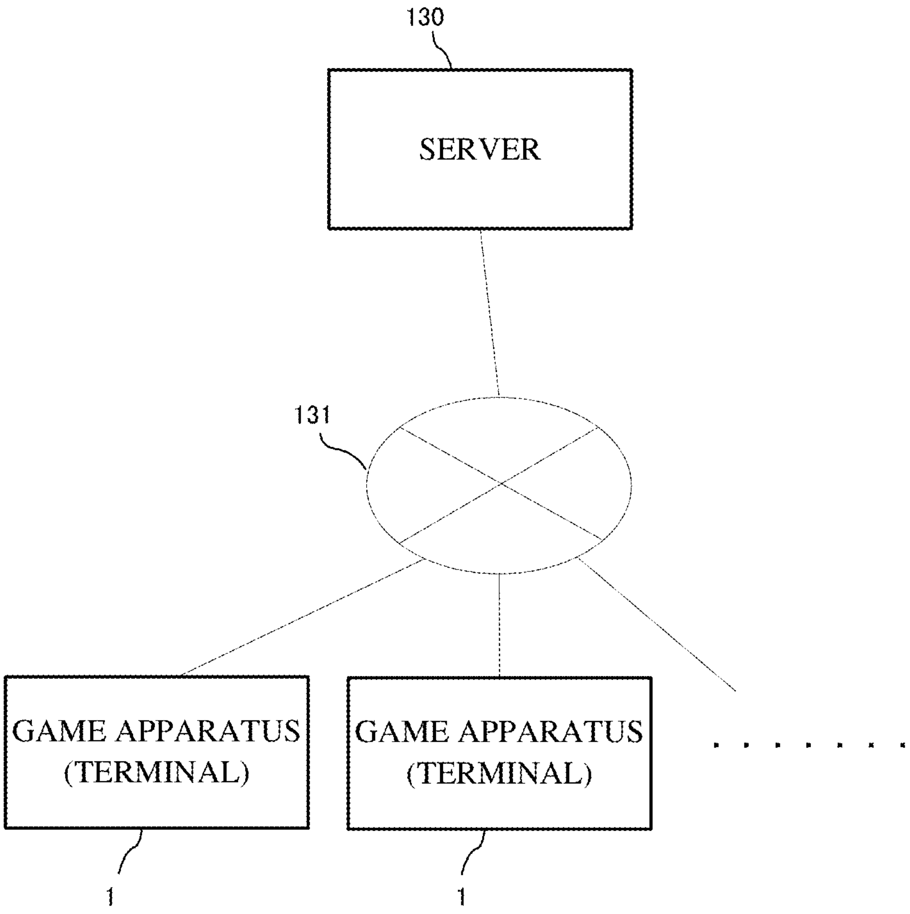
FIG. 4 illustrates a non-limiting example of a communication network.

FIG. 4 illustrates an example of a communication network for the game processing. In the game processing, a plurality of game apparatuses (game systems) 1 and a server 130 are connected communicably with each other via the Internet 131 to enable execution of a multiplayer game. In the game processing, the multiplayer game can be executed by up to four players (up to four game apparatuses). In addition, in the game processing, when performing multiplay in each game stage, the plurality of game apparatuses 1 are connected communicably with each other via the Internet 131 (or by short-range wireless communication or the like, not via the Internet 131) or connected communicably with each other, not via the server 130, to execute the multiplayer game by P2P (Peer to Peer) communication. In the case of multiplay in each game stage, the plurality of game apparatuses 1 may be connected communicably with each other via the server 130 to execute the multiplayer game.

In the game processing, the game is advanced by controlling the actions, etc., of characters placed in the virtual space, in accordance with operations by each player, taking (rendering) an image of the virtual space by a virtual camera, and displaying the image on a screen (display 12). In the game processing, the player selects a desired stage and performs game play in the selected stage.

Figure 5:
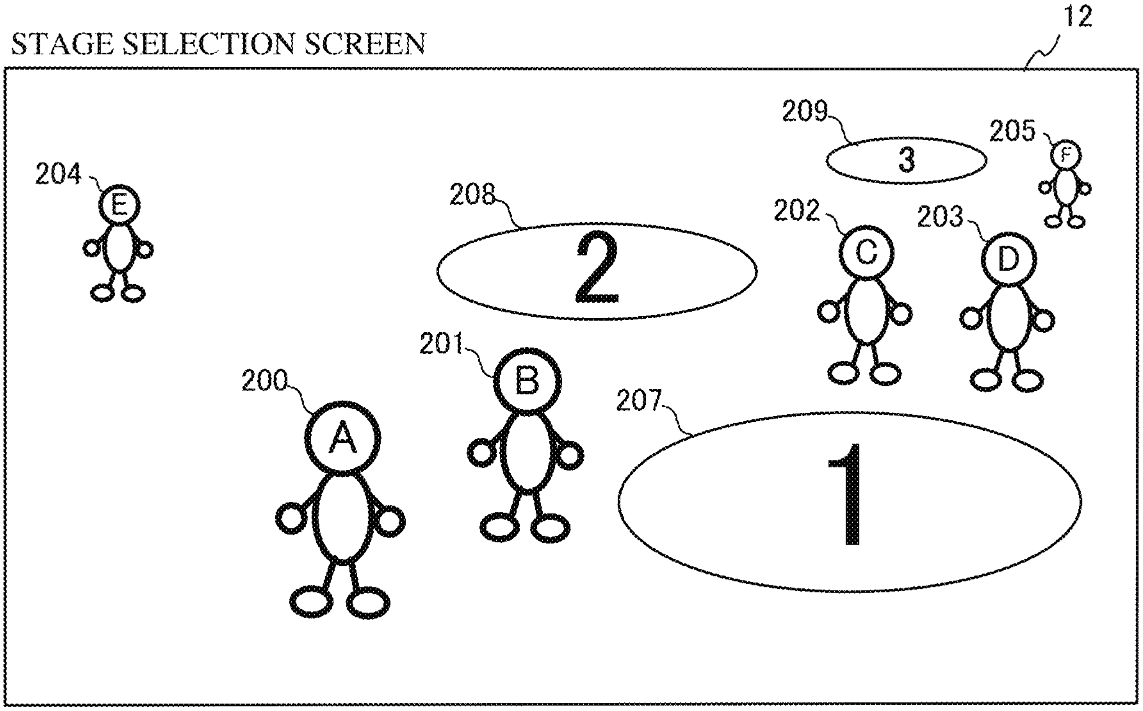
FIG. 5 illustrates a non-limiting example of a stage selection screen.

FIG. 5 illustrates a screen for a player to select a stage to play (sometimes referred to as "stage selection screen"). In the game processing, in the case of a virtual space for each player to select a stage to play (sometimes referred to as "stage selection space"), each player character, which moves on the ground in accordance with operations by each player, and circular regions for selecting a stage (sometimes referred to as "stage selection regions") are placed, and an image of the stage selection space is taken (rendered) by the virtual camera from the obliquely upper side and displayed on the screen of each game apparatus 1. Then, each player can start a game of a stage corresponding to a desired stage selection region by moving the player character operated by the player onto the stage selection region and then performing a predetermined selection operation (e.g., pressing a button).

As shown in FIG. 5, in the stage selection screen on the own game apparatus, a player character (sometimes referred to as "own player character") 200 operated by the player of the own game apparatus, player characters (sometimes referred to as "other player characters") 201 to 205 operated by the players (sometimes referred to as "other players") of the other game apparatuses, a stage selection region 207 for selecting Stage 1, a stage selection region 208 for selecting Stage 2, and a stage selection region 209 for selecting Stage 3 are displayed. For clarity, A is indicated at the head of the own player character 200, and B to F are indicated at the heads of the other player characters 201 to 205, respectively. In the game processing, in the stage selection screen and a stage screen described later, in principle, a display area (rendering area) moves such that the own player character is included in the screen of the own game apparatus.

FIG. 6 to FIG. 20 illustrate a screen (sometimes referred to as "stage screen") of a game stage selected on the stage selection screen described with reference to FIG. 5. In the game processing, a large number of stages are provided, and a virtual space corresponding to each stage (sometimes referred to as "stage space") is provided for each game apparatus.

Figure 6:
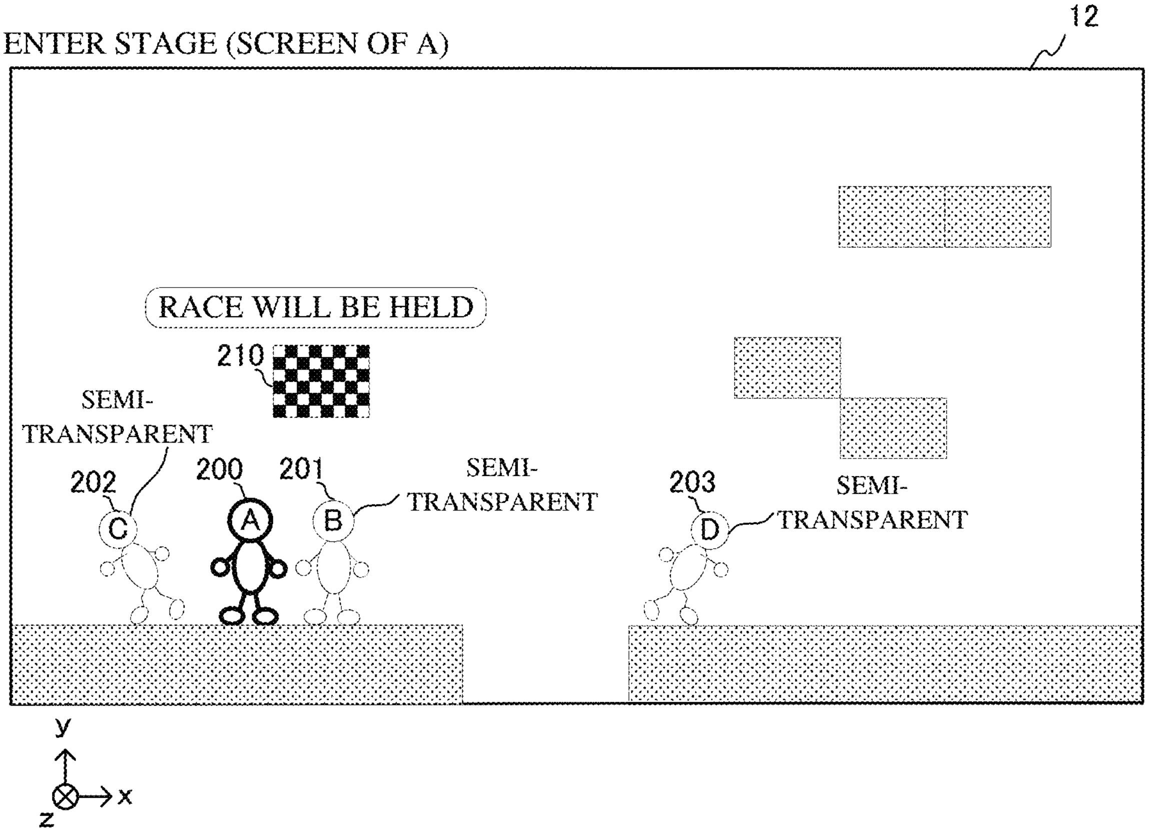
FIG. 6 illustrates a non-limiting example of a game screen.

When a player selects a stage on the stage selection screen described with reference to FIG. 5, a start point of the stage is displayed. Specifically, as shown in FIG. 6, etc., player characters, objects such as blocks and ground that make up the stage, enemy characters (not shown), etc., are placed in the stage space. Here, in FIG. 6, four players select the same stage, and four player characters 200 to 203 are placed.

An image of the stage space is taken (rendered) directly sideways by the virtual camera and displayed on the screen of each game apparatus. In each stage of this game, the own player character, the other player characters, and the enemy characters can move left, right, up, and down, but not in the directions toward the near side and the far side. That is, these characters can move in the xy-plane shown in FIG. 6. The player plays the stage by operating the own player character to move from the start point. If the own player character reaches the goal point, the stage is cleared and the play of the stage ends. If a mistake such as contact with an enemy character is made a predetermined number of times, clearing the stage fails and the play ends.

In this game, if all players (up to four players) participating in the game of a stage are friends, the players (player characters) can race against each other in a time race in that stage. A player who does not play a time race aims to reach the goal of the stage. Hereinafter, specific description will be given. Friends are players having a friend relationship that is established when, while the game processing is not executed, a friend request sent from one player (one player account) to another player (another player account) is accepted by the other player (a state where both player accounts are linked by a friend relationship)

FIG. 6 shows that, after, in the stage selection space (see FIG. 5), four players (four players who operate the player characters 200 to 203) who are friends with each other select the stage selection region 207 and a start point of the stage corresponding to the stage selection region 207 is displayed, the player characters 200 to 203 have entered the start point. FIG. 6 also shows the screen of the game apparatus 1 with which the player character 200 is operated (the screen seen by the player who operates the player character 200). As shown in FIG. 6, in the exemplary embodiment, the other player characters are displayed semi-transparently (on the screen of each game apparatus 1). In addition, in the game apparatus of each player, the position, etc. (e.g., coordinates, orientation, posture) of each player character in the stage are synchronized, while the state of the stage is not synchronized. For example, when, in the stage space of any one game apparatus, an object (e.g., a block) is destroyed by the player character of this game apparatus, the game proceeds in the stage space of another game apparatus in a state where the object is not destroyed, if the object is not destroyed by the player character of the other game apparatus. However, as for a race block 210 described later, the state thereof is synchronized in the game apparatus of each player. The above is an example, and the state of the stage may be synchronized in the game apparatus of each player.

As shown in FIG. 6, when the four players who are friends with each other enter the stage, the race block 210 (trigger object) for player characters to enter a race is placed at the start point of the stage. In addition, a text "Race will be held" is displayed above the race block 210 to indicate that the race can be played.

Next, as shown in FIG. 7, when the player character 201 jumps and hits the race block 210 (acts on the race block 210), invitation of members to participate in the race is started (a predetermined invitation time (e.g., 20 seconds) starts decreasing) and the player character 201 enters the race. In addition, as shown in FIG. 6, above the race block 210, a text "Inviting members" is displayed, and the face of the entered player character 201 is displayed.

Figure 8:
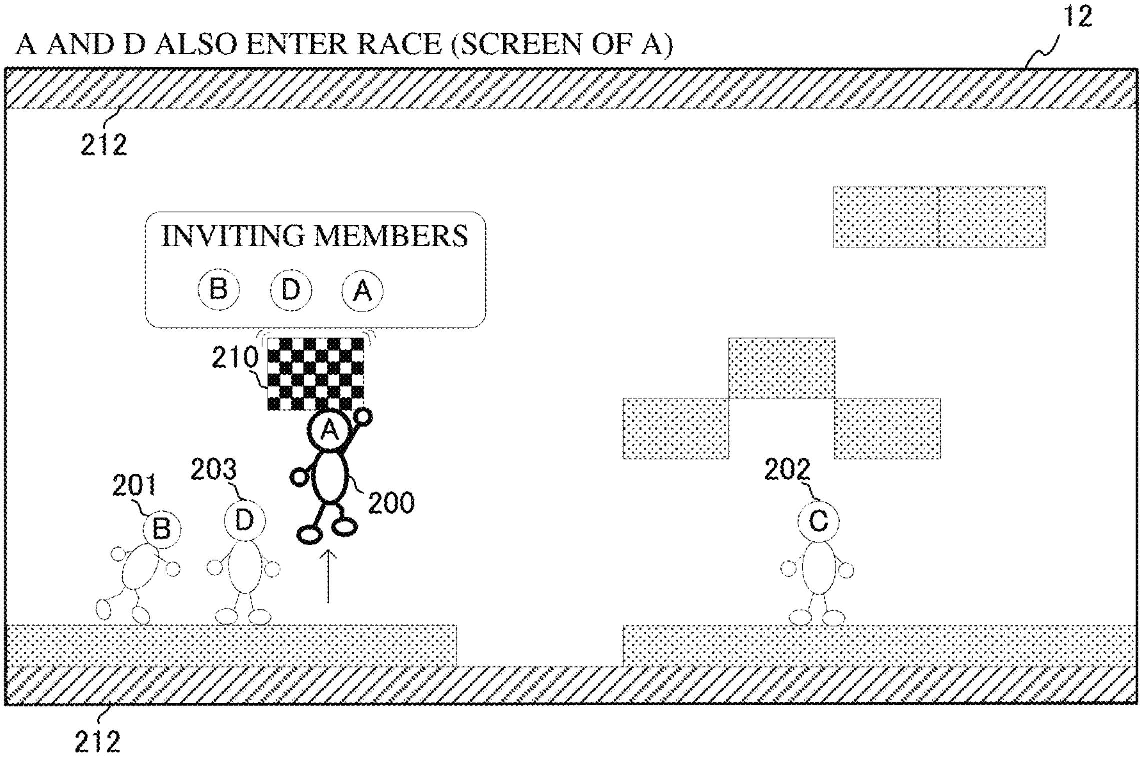
FIG. 8 illustrates a non-limiting example of the game screen.

Next, as shown in FIG. 8, when the player character 203 jumps and hits the race block 210 (acts on the race block 210; not shown) and the player character 200 then jumps and hits the race block 210 (acts on the race block 210), the player character 203 and the player character 200 enter the race. As shown in FIG. 8, the faces of the entered player character 203 and player character 200 are additionally displayed above the race block 210. Also, as shown in FIG. 8, bands 212 are displayed on the upper and lower sides of the screen display of the game apparatus 1 with which the own player character (player character 200) is operated, to indicate that the own player character has entered the race. In the exemplary embodiment, even if a player character that has already entered the race hits the race block 210 again, the entry is not cancelled. If a player character that has already entered the race hits the race block 210 again, the entry may be cancelled. In addition, although a player enters the race by hitting, the present disclosure is not limited thereto, and for example, by a player character (or an item used by the player character) coming contact with the race block 210, the player character may enter the race.

Figure 9:
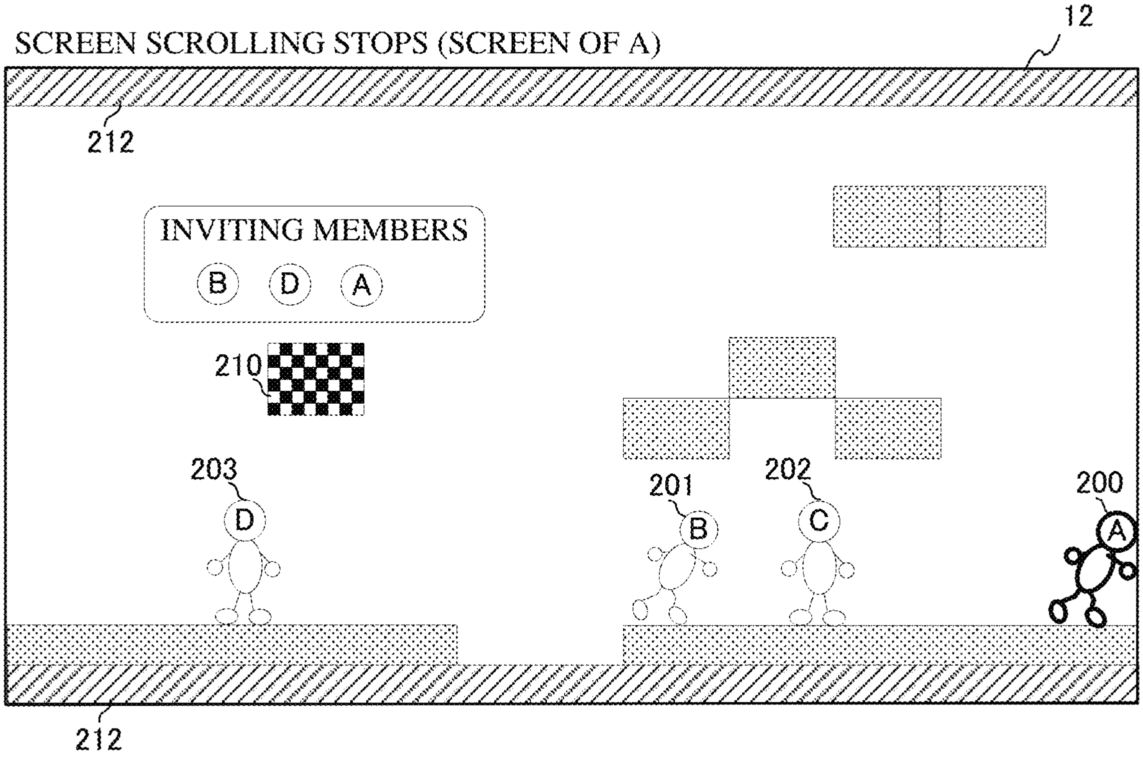
FIG. 9 illustrates a non-limiting example of the game screen.

Here, if the own player character moves out of the screen display range (the imaging range of the virtual camera in the virtual space) in accordance with an operation by the player, the own player character is not displayed, which hinders operations. Therefore, it is usually not possible for the own player character to move out of the screen display range in accordance with an operation by the player, and when the own player character moves, the screen is scrolled (the imaging range of the virtual camera in the virtual space moves). However, in the exemplary embodiment, as shown in FIG. 9, when the own player character enters the race, the execution of scrolling display of the screen is stopped (locked) such that the own player character cannot move out of the screen display range. In FIG. 9, the own player character (player character 200) who has entered the race has moved forward to the right end of the screen display range, but cannot move out of the screen display range since the execution of scrolling display of the screen is stopped. By such setting, a player character that has entered the race is prevented from moving forward before the race starts. Instead of stopping the execution of scrolling display of the screen, the player character may be unable to move even if the player performs an operation. For example, a starting line may be provided, and all player characters may be forced to gather (line up) at the starting line such that each player character cannot move even if the player performs an operation.

Figure 10:
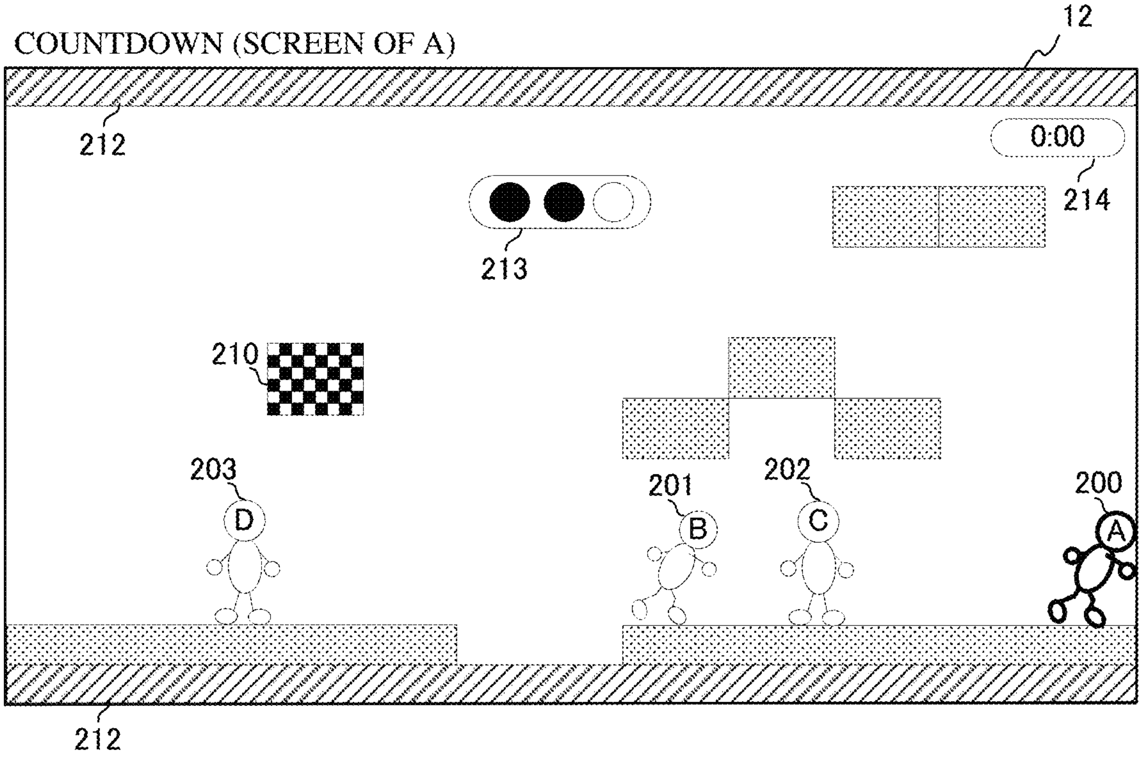
FIG. 10 illustrates a non-limiting example of the game screen.

When the above-described predetermined invitation time (e.g., 20 seconds) elapses, or when the four player characters (all the player characters) enter the race, (a race entry period ends and) a countdown display up to the start of the race is started. Specifically, as shown in FIG. 10, the countdown display is performed by displaying a traffic light 213, and a timer 214 for measuring the time from the start to the finish of the race for the own player character is displayed. When the above-described predetermined invitation time (e.g., 20 seconds) elapses in a state where only one player character has entered the race, the state returns to a state where no one has entered the race (see FIG. 6).

Figure 11:
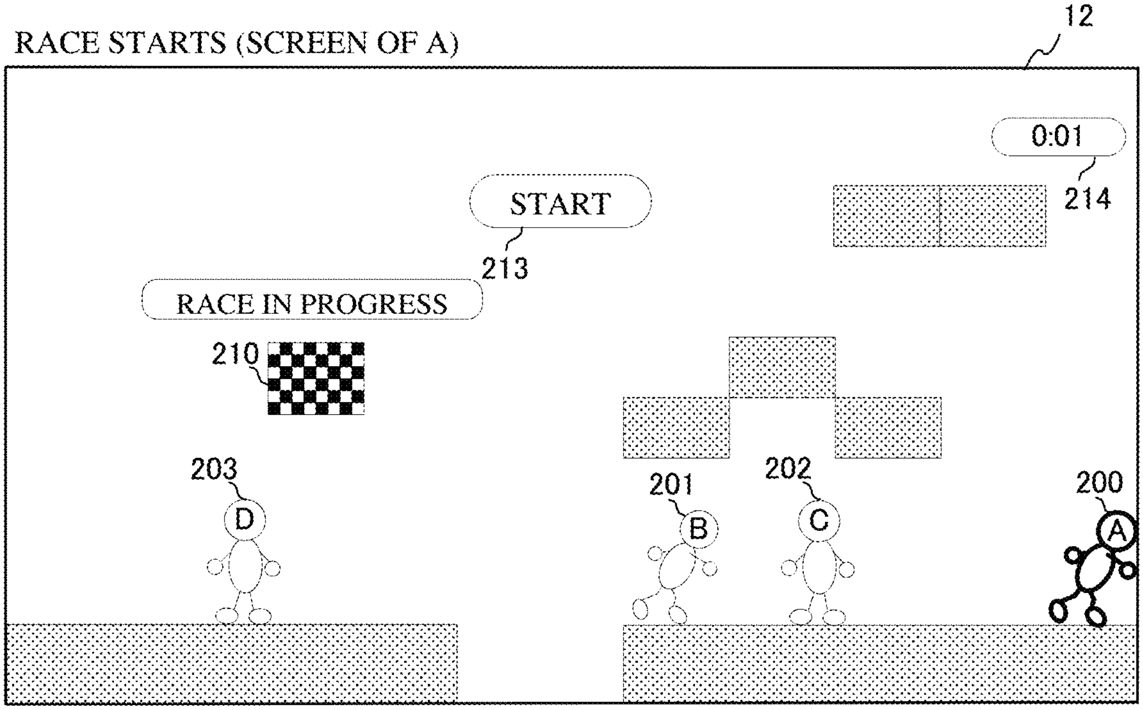
FIG. 11 illustrates a non-limiting example of the game screen.
Figure 12:
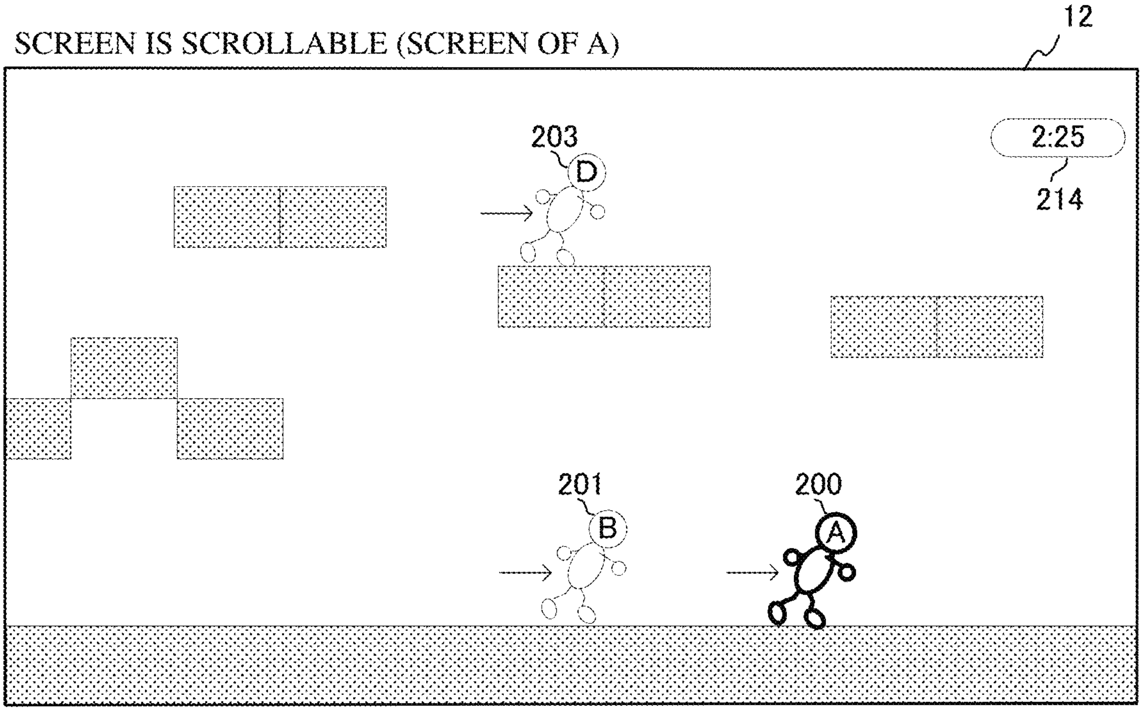
FIG. 12 illustrates a non-limiting example of the game screen.

Next, as shown in FIG. 11, when the countdown display ends, the traffic light 213 changes to display a text "Start", and at the same time, the timer 214 starts measuring time, and the stop (lock) of the scrolling display of the screen is cancelled to allow the player characters that have entered the race to move forward as shown in FIG. 12. In addition, as shown in FIG. 11 and FIG. 12, when the race is started, the bands 212 are hidden, and a text "Race in Progress" is displayed above the race block 210.

Figure 13:
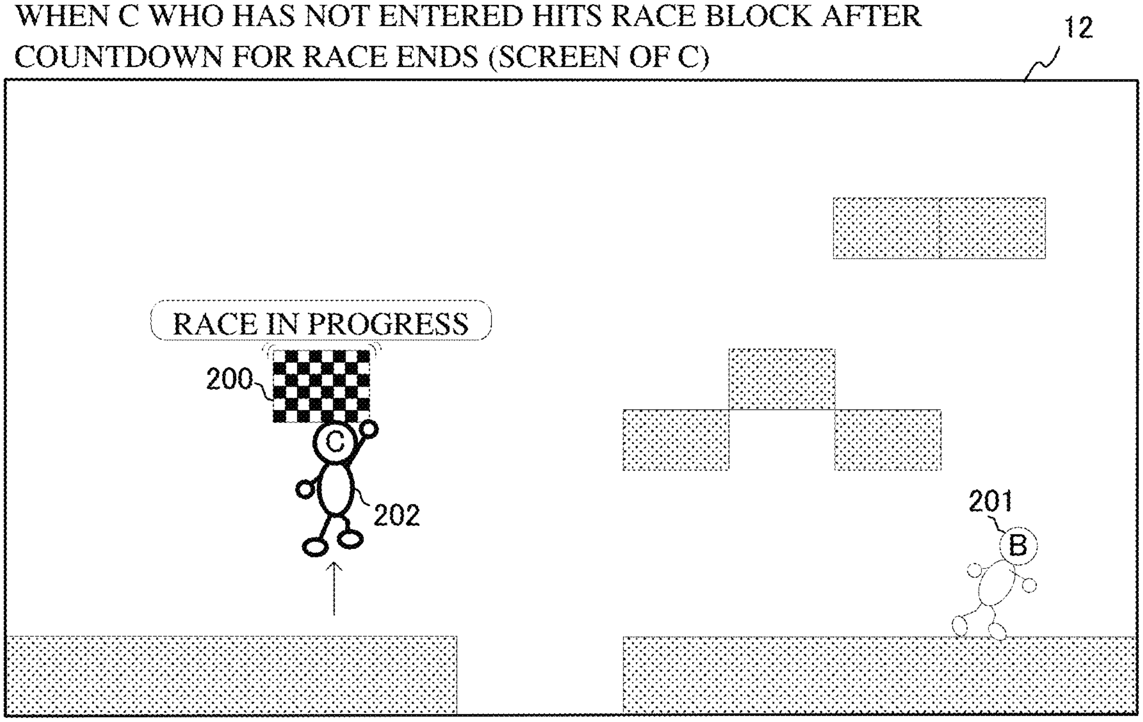
FIG. 13 illustrates a non-limiting example of the game screen.

As described above, on the screen of the game apparatus 1 of each player character that has entered the race, the time is measured by the timer 214 and the game proceeds in a race mode (first mode). On the screen of the game apparatus 1 of a player character that has not entered the race, the game proceeds in a normal mode (second mode), in which no race is conducted, without shifting to a race state. As shown in FIG. 13, during a period from the end of the countdown for the race to the end of the race, even if the player character 202 which has not entered the race hits the race block 210, the player character 202 cannot participate in the race. Thus, in the exemplary embodiment, two or more races are not executed in parallel in a single stage.

Figure 14:
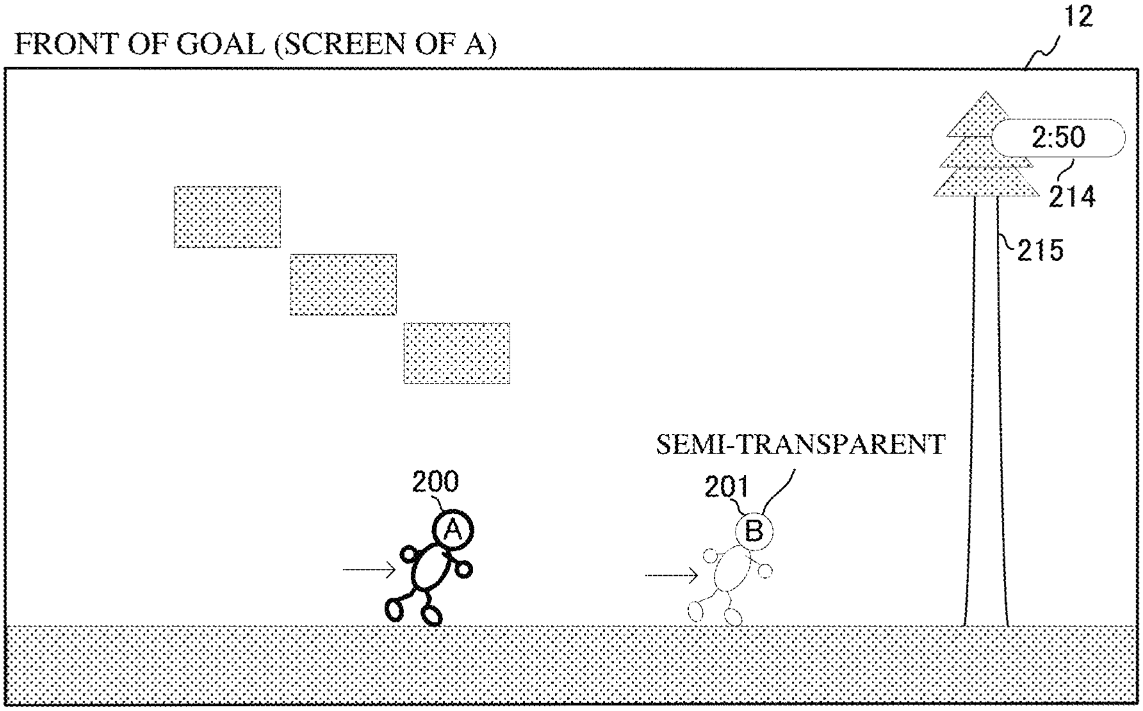
FIG. 14 illustrates a non-limiting example of the game screen.
Figure 15:
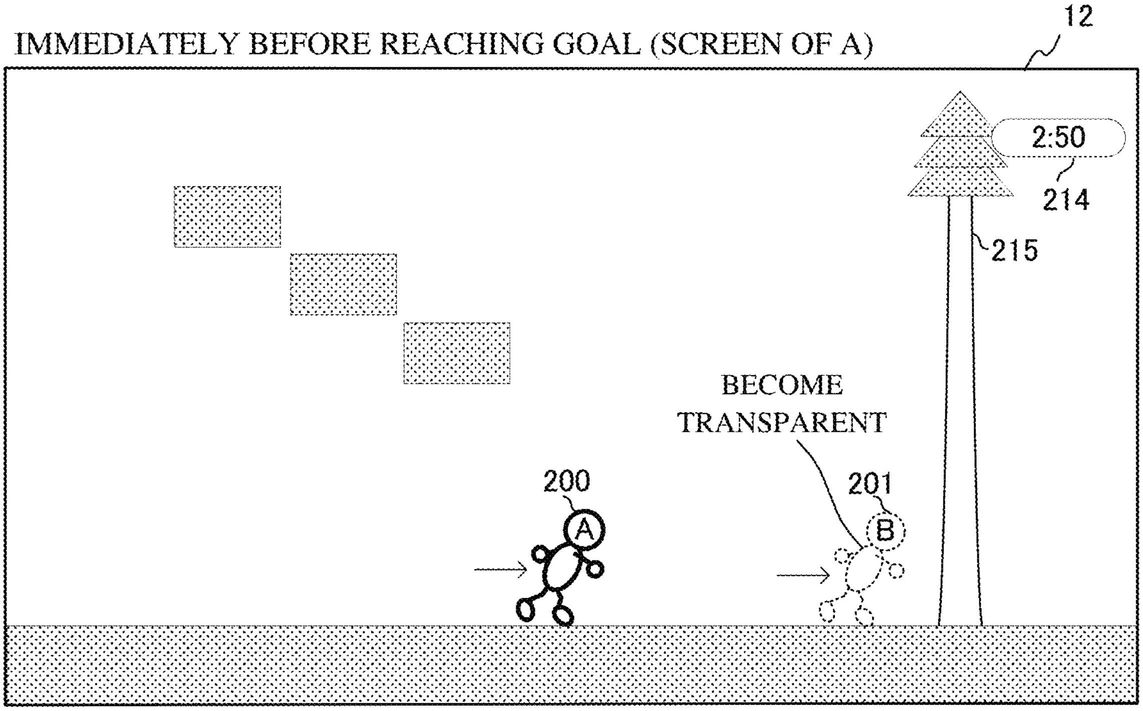
FIG. 15 illustrates a non-limiting example of the game screen.

Next, as shown in FIG. 14, a goal-front state where a goal tree 215, which can be grabbed by a player character to thereby reach the goal, is displayed on the screen, is brought about. Then, as shown in FIG. 15, when the other player character 201 enters a predetermined range of the goal tree 215 (e.g., within 2 meters from the goal tree 215 in the virtual space), the display of the other player character 201 gradually changes from semi-transparent to transparent as the other player character 201 approaches the goal tree 215, becomes transparent immediately before the other player character 201 grabs the goal tree 215, and returns to being semi-transparent when the other player character 201 grabs the goal tree 215. Here, due to a communication delay or the like, the timing at which the player character grabs the goal tree 215 (reaches the goal) in each game apparatus 1 may be different between the multiple game apparatuses 1 with which the race is played in multiplay. In the exemplary embodiment, by changing the display of the other player character from semi-transparent to transparent immediately before the goal tree 215 is grabbed as described above, an uncomfortable feeling due to the finish timing being different between each game apparatus 1 can be prevented.

Figure 16:
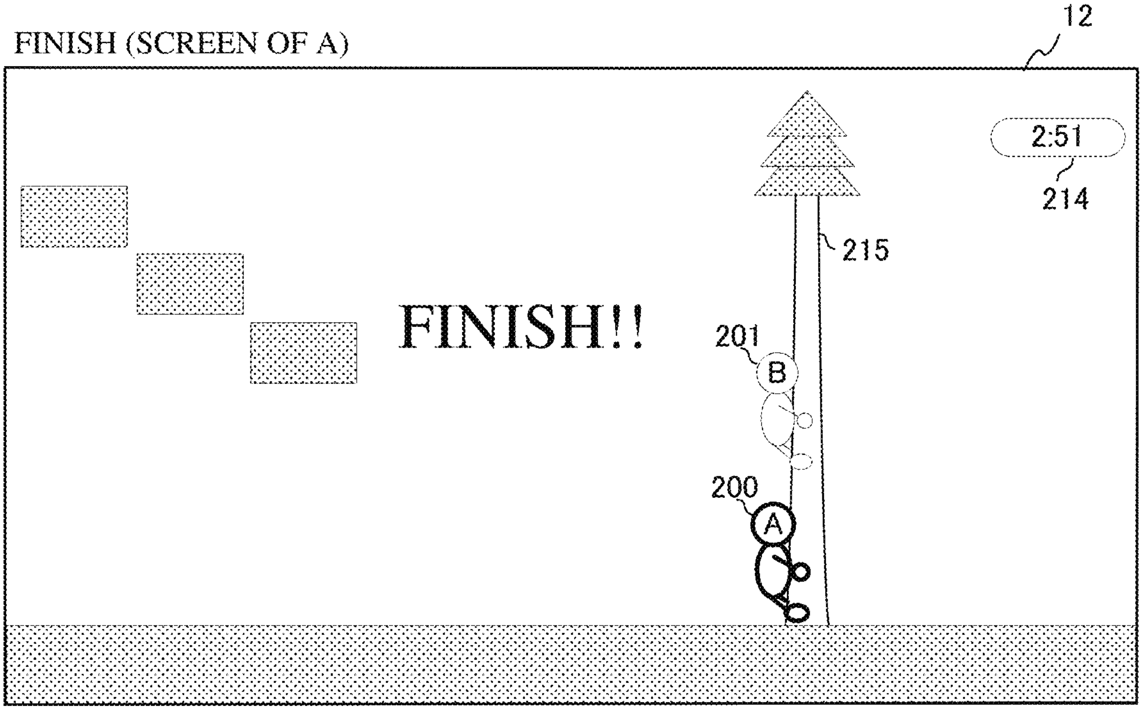
FIG. 16 illustrates a non-limiting example of the game screen.

Next, as shown in FIG. 16, when the own player character 200 grabs the goal tree 215 to reach the goal, a text "Finish!!" is displayed, the time measurement of the timer 214 stops, and the time of the race for the own player character 200 is fixed. Similarly, in the game apparatus 1 with which another player character is moved, when the other player character grabs the goal tree 215 to reach the goal, a text "Finish!!" is displayed, the time measurement of the timer 214 stops, and the time of the race for the other player character is fixed.

Figure 17:
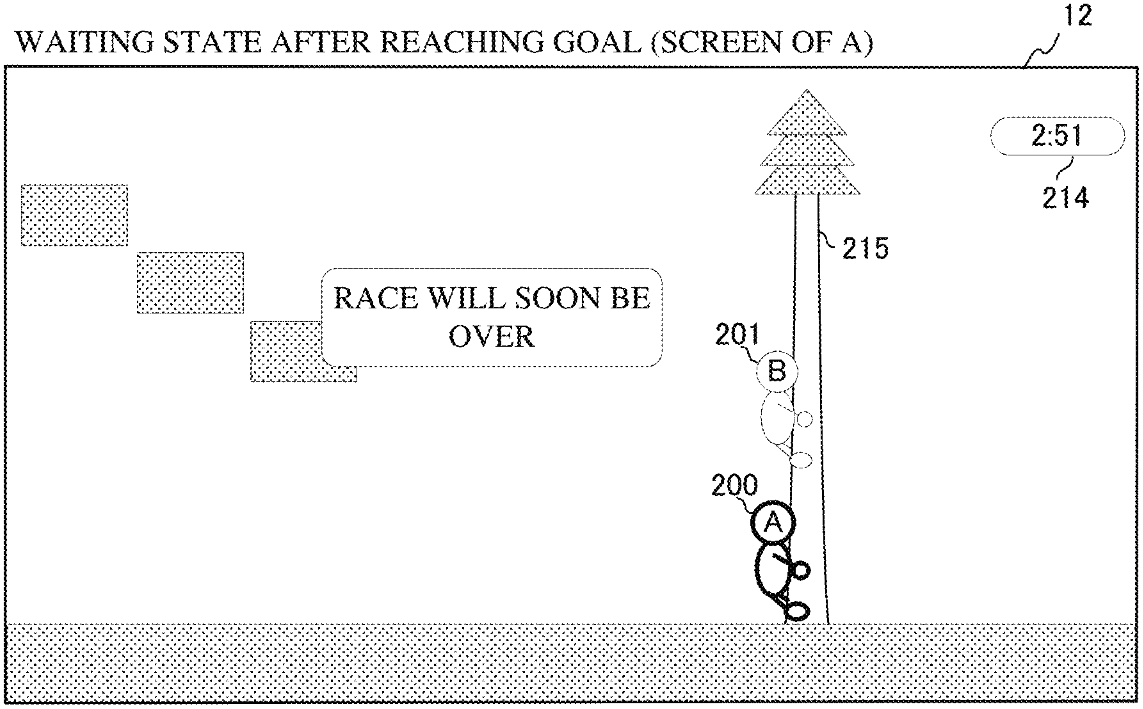
FIG. 17 illustrates a non-limiting example of the game screen.

Next, as shown in FIG. 17, a waiting state continues and a text "Race will soon be over" is displayed until a predetermined time (e.g., 30 seconds) elapses after the player character 201 first reaches the goal.

Figure 18:
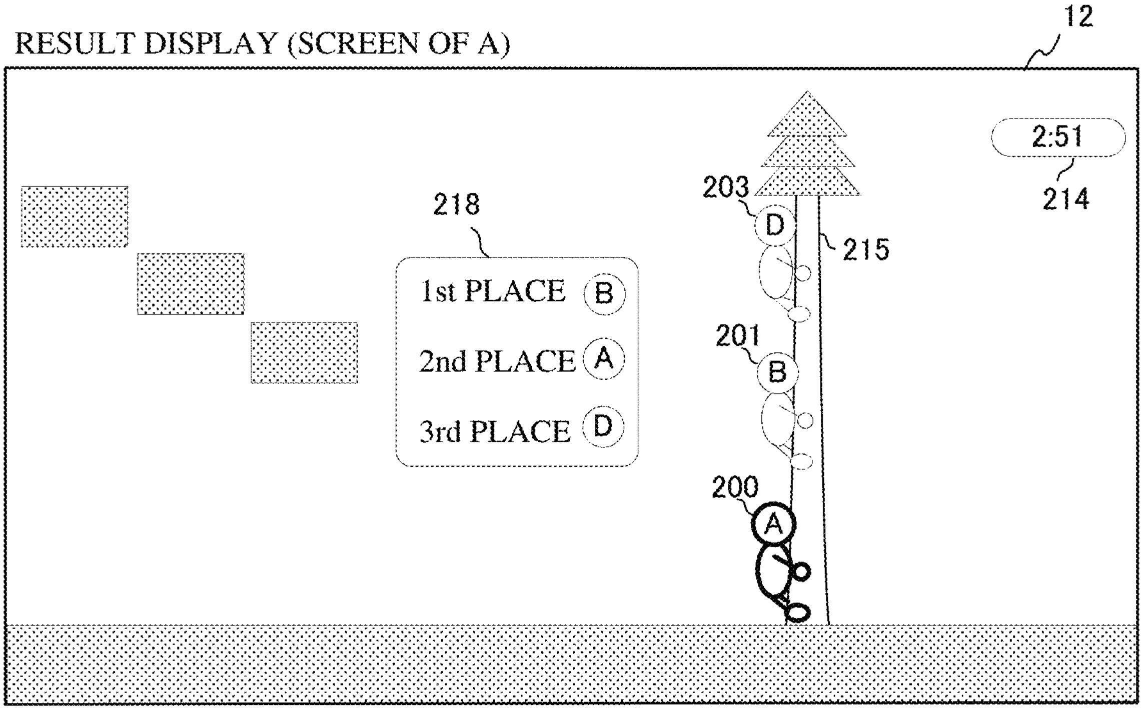
FIG. 18 illustrates a non-limiting example of the game screen.

Next, as shown in FIG. 18, when the player character 203 reaches the goal and all the player characters that have entered the race reach the goal before the above predetermined time (e.g., 30 seconds) elapses, the race is over, and a result display 218 indicating the race ranking is displayed to announce the results of this race. Here, the time for each player character is fixed in each game apparatus as described above. Then, the time for each player character is notified and shared among the game apparatuses, whereby the same ranking is displayed on each game apparatus.

Figure 19:
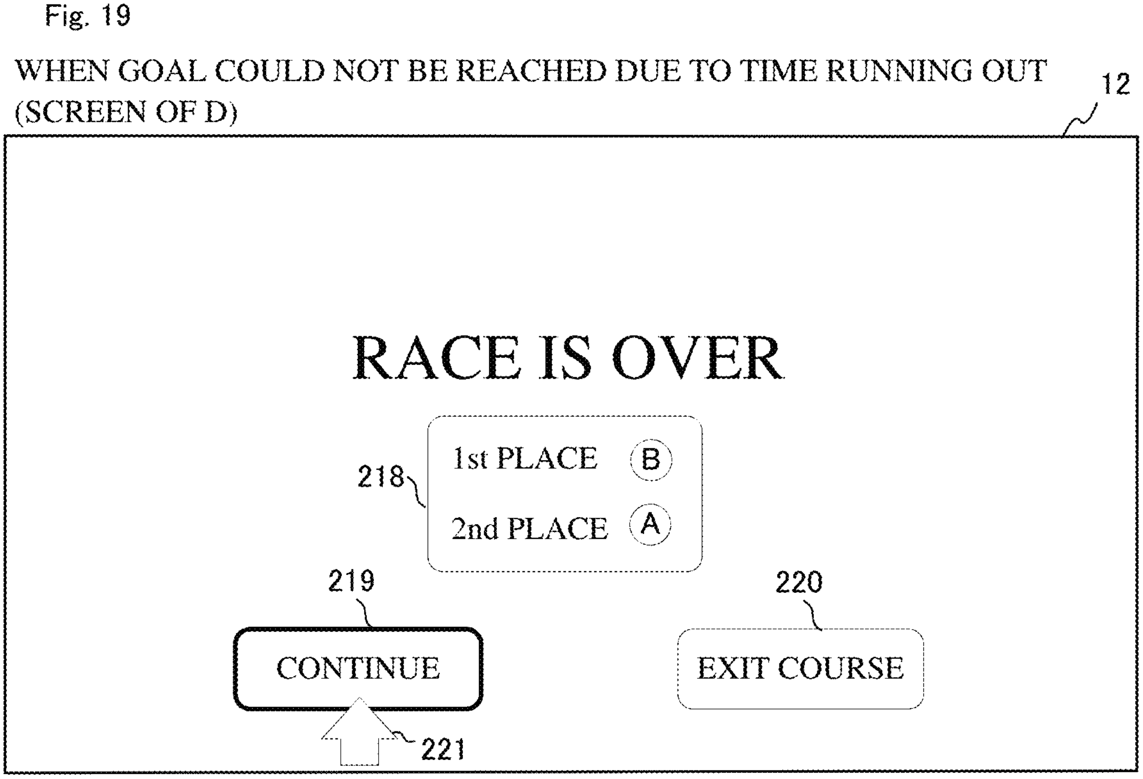
FIG. 19 illustrates a non-limiting example of the game screen.

On the other hand, after the player character 201 first reaches the goal, when the above predetermined time (e.g., 30 seconds) elapses before the player character 203 reaches the goal, the image of the course is hidden to end the race, and a text "Race is over", the result display 218, a button 219 showing a text "Continue", a button 220 showing a text "Exit Course", and a cursor 221 are displayed on the screen of the game apparatus with which the player character 203 is moved, as shown in FIG. 19. Then, when the player operates the cursor 221, designates the button 219 showing "Continue", and presses a predetermined button, the game continues in the normal mode (second mode), in which no race is conducted, from the position in the course at the end of the race. On the other hand, when the player operates the cursor 221, designates the button 220 showing "Exit Course", and presses the predetermined button, the player character 203 exits the course (stage) and returns to the stage selection space (see FIG. 5). In FIG. 19, the player character 203 (D) which has not reached the goal when the race ends is not displayed in the result display 218, but the player character 203 may be displayed in the result display 218 (together with a text "No Record").

Figure 20:
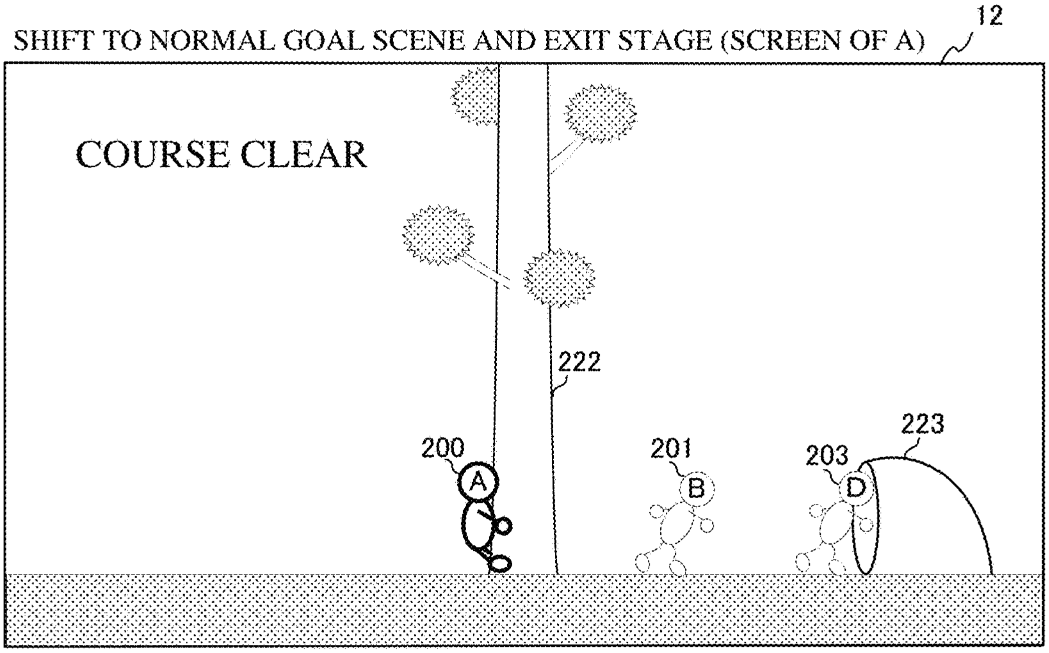
FIG. 20 illustrates a non-limiting example of the game screen.

Next, as shown in FIG. 20, each player character that has reached the goal exits the course (stage) after the scene in FIG. 18 in which the goal is reached (race mode (first mode)) is switched to the normal mode (second mode). Specifically, as shown in FIG. 20, after the scene is switched to a state where a player character that has grabbed a goal tree 222 in the normal mode to reach the goal and a text "Course Clear" are displayed (normal mode), the player character enters an exit 223. The player character that has entered the exit 223 returns to the stage selection space (see FIG. 5).

[Details of Information Processing of Exemplary Embodiment]

Next, the information processing of the exemplary embodiment will be described in detail with reference to FIG. 21 to FIG. 25.

[Data to be Used]

Figure 21:
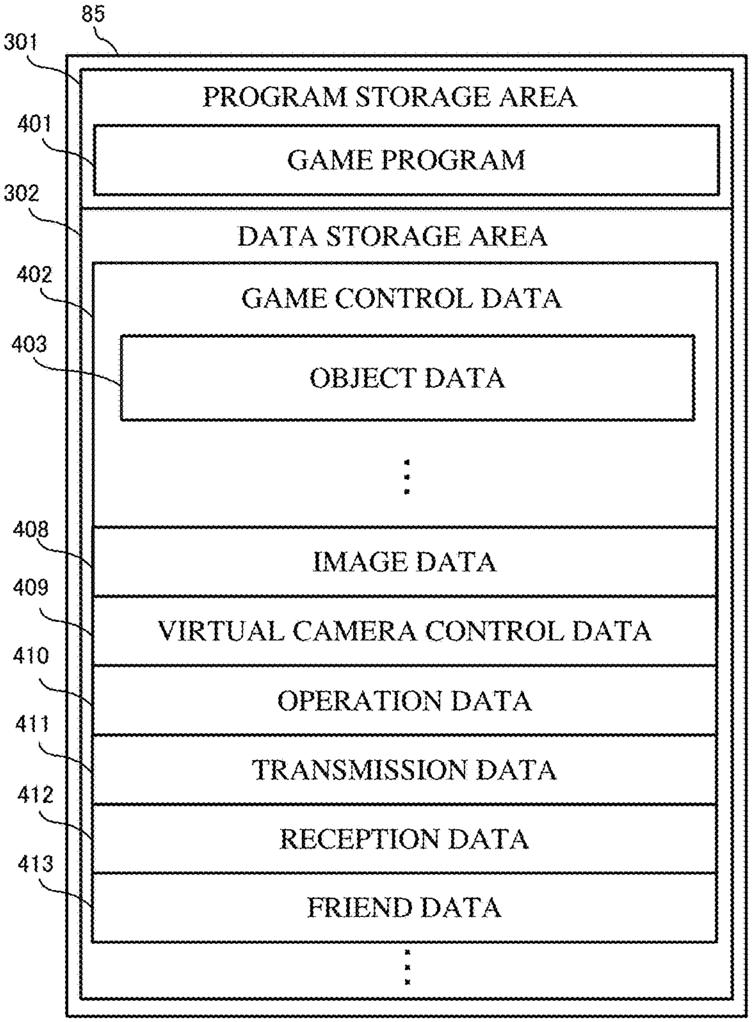
FIG. 21 shows a non-limiting example of various types of data stored in a DRAM 85.

Various types of data used in the game processing will be described. FIG. 21 shows an example of data stored in the DRAM 85 of the game system 1. As shown in FIG. 21, the DRAM 85 is provided with at least a program storage area 301 and a data storage area 302. A game program 401 is stored in the program storage area 301. In the data storage area 302, game control data 402, image data 408, virtual camera control data 409, operation data 410, transmission data 411, reception data 412, friend data 413, etc., are stored. The game control data 402 includes object data 403.

The game program 401 is a game program for executing the game processing.

The object data 403 is data of objects to be placed in the virtual space, such as player characters, enemy characters, items, ground, blocks, rocks, stones, trees, and buildings. In addition, the object data 403 includes data of the coordinates (position), the orientation, the posture, the state, etc., of each object.

The image data 408 is image data of backgrounds, virtual effects, etc.

The virtual camera control data 409 is data for controlling the motion of the virtual camera placed in the virtual space. Specifically, the virtual camera control data 409 is data that specifies the position/orientation, angle of view, imaging direction, etc., of the virtual camera.

The operation data 410 is data indicating the contents of operations performed on the left controller 3 and the right controller 4. The operation data 410 includes, for example, data indicating motions and orientation changes of the left controller 3 and the right controller 4 and input states regarding press states and the like of various buttons. The contents of the operation data 410 are updated at a predetermined cycle on the basis of signals from the left controller 3 and the right controller 4.

The transmission data 411 is data to be transmitted to other game systems 1, and is data including at least information for identifying the transmission source, and the contents of the operation data 410. The transmission data 411 includes data regarding the own player character (data indicating coordinates (position), posture, state, etc.), etc., to be transmitted to other game systems 1 of multiplay partners (or server).

The reception data 412 is data stored such that transmission data received from other game systems 1 (i.e., transmission sources) can be discerned for each of the other game systems 1. The reception data 412 includes data regarding other player characters (data indicating coordinates (position), posture, state, etc.) received from the other game systems 1 of the multiplay partners (or server).

The friend data 413 is data indicating the accounts of other players linked to the account of the player as friends (i.e., data indicating players who are friends of the player). The friend data 413 is, for example, data received from the server (see FIG. 4) when the game is started up.

In addition, various types of data to be used in game processing are stored as necessary in the DRAM 85.

[Details of Game Processing]

Next, the game processing according to the exemplary embodiment will be described in detail with reference to flowcharts. FIG. 22 to FIG. 25 are each an example of a flowchart showing the details of the game processing according to the exemplary embodiment.

Figure 22:
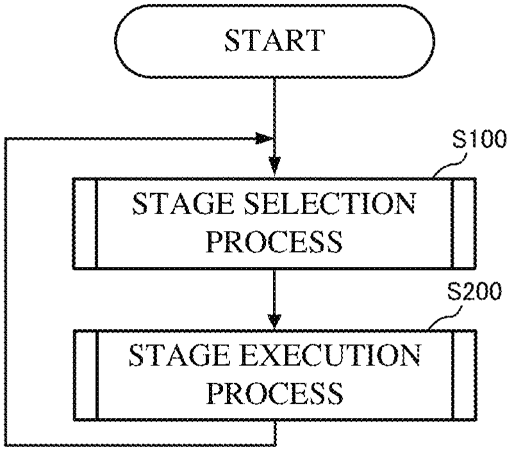
FIG. 22 is a non-limiting example of a flowchart of game processing.

First, upon start of the game processing, in step S100 in FIG. 22, the processor 81 performs a stage selection process described later with reference to FIG. 23. Then, the processing proceeds to step S200.

In step S200, the processor 81 performs a stage execution process described later with reference to FIG. 24 and FIG. 25. Then, the processing returns to step S100.

Figure 23:
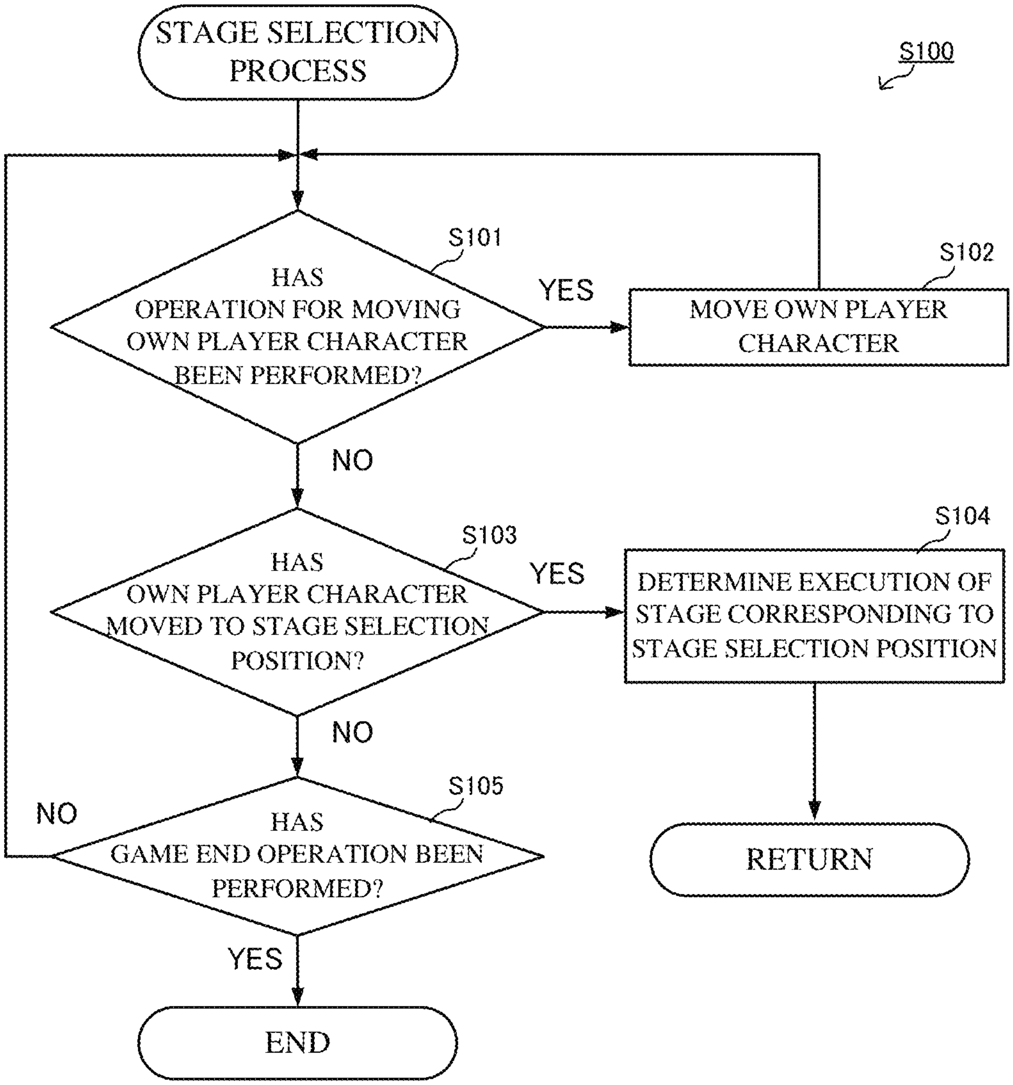
FIG. 23 is a non-limiting example of a flowchart of the game processing.

FIG. 23 is an example of a flowchart showing the details of the stage selection process. Hereinafter, description will be given with reference to FIG. 23.

First, in step S101, the processor 81 determines whether or not an operation for moving the own player character has been performed, on the basis of the operation data 410. If the result of this determination is YES, the processing shifts to step S102, and if the result of this determination is NO, the processing shifts to step S103.

In step S102, the processor 81 moves the own player character on the basis of the operation in step S101. In addition, the processor 81 transmits the position, the posture, etc., of the own player character to the other game systems 1 (other game apparatuses) of the multiplay partners. Then, the processing returns to step S101. By the processes in steps S101 and S102, each player character moves in the stage selection space in accordance with the operation by each player (see FIG. 5).

In step S103, the processor 81 determines whether or not the own player character has moved to any of stage selection positions in the stage selection space, on the basis of the object data 403, etc. If the result of this determination is YES, the processing shifts to step S104, and if the result of this determination is NO, the processing shifts to step S105.

In step S104, the processor 81 determines execution of a stage corresponding to the stage selection position to which the own player character has moved in step S103. That is, the processor 81 determines execution of a game stage selected by the player operating the own player character. Then, the processing shifts to step S200 in FIG. 22, and the game of the stage selected by the player in step S103 is started.

In step S105, the processor 81 determines whether or not a predetermined game end operation has been performed, on the basis of the operation data 410. If the result of this determination is YES, the game processing ends, and if the result of this determination is NO, the processing returns to step S101.

Figure 24:
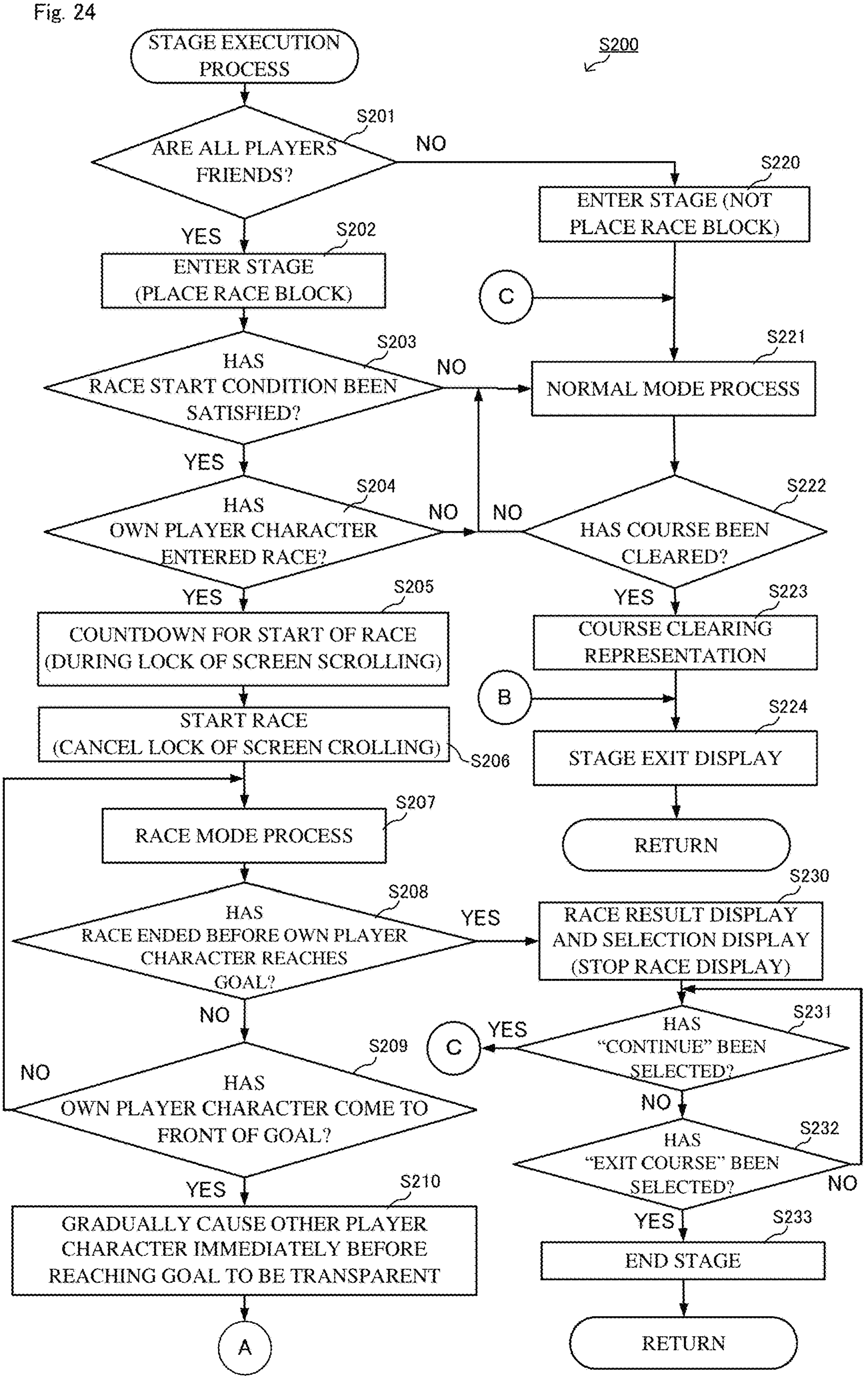
FIG. 24 is a non-limiting example of a flowchart of the game processing.
Figure 25:
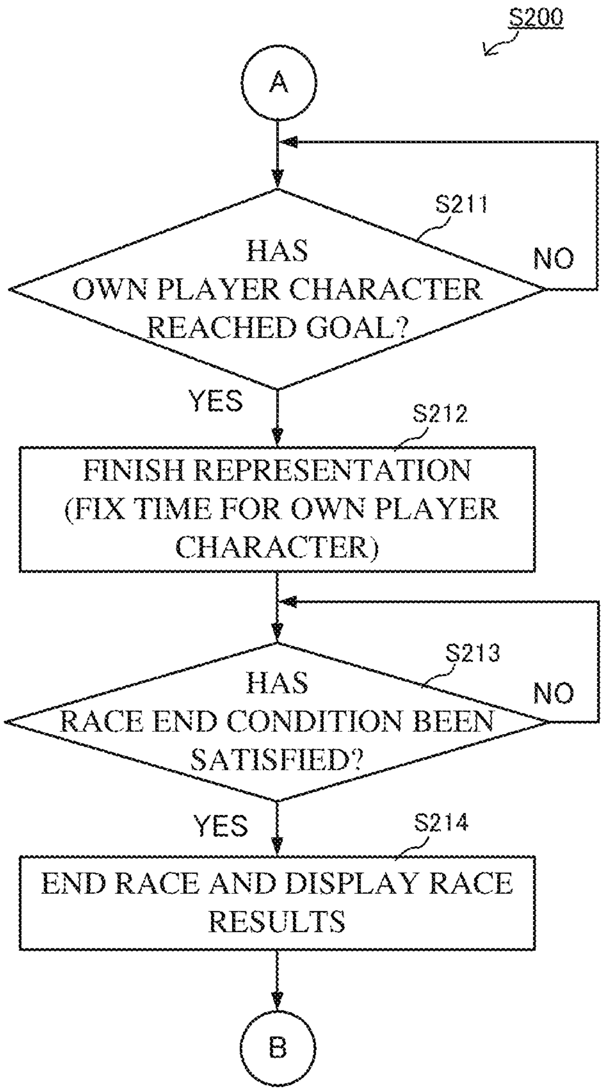
FIG. 25 is a non-limiting example of a flowchart of the game processing.

FIG. 24 and FIG. 25 are each an example of a flowchart showing the details of the stage execution process. Hereinafter, description will be given with reference to FIG. 24 and FIG. 25.

First, in step S201 in FIG. 24, the processor 81 determines whether or not all players playing the stage (same stage) determined in step S104 in FIG. 23 are friends with each other, on the basis of the friend data 413. If the result of the determination in step S201 is YES, the processing shifts to step S202, and if the result of this determination is NO, the processing shifts to step S220.

In step S202, the processor 81 causes the player characters to enter the stage (see FIG. 6). In addition, the processor 81 places the race block 210 (trigger object) for player characters to enter a race, in the stage. Then, the processing shifts to step S203.

In step S203, the processor 81 determines whether or not a race start condition has been satisfied. As described with reference to FIG. 7 and FIG. 8, the race start condition is a condition that after a player character first acts on the race block 210 (enters the race), at least one player character acts on the race block 210 or all other player characters act on the race block 210 within a predetermined invitation time (e.g., 20 seconds). If the result of the determination in step S203 is YES, the processing shifts to step S204, and if the result of this determination is NO, the processing shifts to step S221.

In step S204, the processor 81 determines whether or not the own player character has entered the race (has already acted on the race block 210). If the result of the determination in step S204 is YES, the processing shifts to step S205, and if the result of this determination is NO, the processing shifts to step S221. Here, as described with reference to FIG. 9, when the own player character enters the race, control is performed such that the scrolling display of the screen is locked and the own player character cannot move beyond the screen display range.

In step S205, the processor 81 performs a countdown for the start of the race as described with reference to FIG. 10. Then, the processing shifts to step S206.

In step S206, in accordance with the end of the countdown in step S205, the processor 81 starts the race, as described with reference to FIG. 11 and FIG. 12, and cancels the lock of the scrolling display of the screen to allow the own player character to move forward.

In step S207, the processor 81 performs a race mode process of advancing the game in the race mode (first mode). Then, the processing shifts to step S208.

In step S208, the processor 81 determines whether or not the race has ended before the own player character reaches the goal. As described later for step S213 in FIG. 25, the race ends when a race end condition is satisfied. If the result of the determination in step S208 is YES, the processing shifts to step S230, and if the result of this determination is NO, the processing shifts to step S209.

In step S209, the processor 81 determines whether or not the own player character has come to the front of the goal (see FIG. 14). If the result of the determination in step S209 is YES, the processing shifts to step S210, and if the result of this determination is NO, the processing returns to step S207.

In step S210, the processor 81 gradually causes the other player character immediately before reaching the goal to be transparent as described with reference to FIG. 15. Then, the processing shifts to step S211 in FIG. 25.

In step S211 in FIG. 25, the processor 81 waits until the own player character reaches the goal (NO), and shifts the processing to step S212 if the own player character reaches the goal (YES).

In step S212, the processor 81 fixes the time for the own player character, and performs a finish representation for the own player character, as described with reference to FIG. 16. Then, the processing shifts to step S213.

In step S213, the processor 81 waits until the race end condition is satisfied (NO), and shifts the processing to step S214 if the race end condition is satisfied (YES). As described with reference to FIG. 17 to FIG. 19, the race end condition is a condition that before a predetermined waiting time (e.g., 30 seconds) elapses after a player character first reaches the goal, all the player characters participating in the race reach the goal, or before all the player characters participating in the race have reached the goal after a player character first reaches the goal, the predetermined waiting time elapses.

In step S214, the processor 81 ends the race and displays the results of the race as described with reference to FIG. 18. Then, the processing shifts to step S224 in FIG. 24.

If the result of the determination in step S201 is NO, in step S220, the processor 81 causes the player characters to enter the stage (see FIG. 6). However, in this case, the processor 81 does not place the race block 210 for player characters to enter the race, in the stage. Then, the processing shifts to step S221.

In step S221, the processor 81 performs a normal mode process of advancing the game in the normal mode (second mode). Then, the processing shifts to step S222.

In step S222, the processor 81 determines whether or not the own player character playing in the normal mode has reached the goal point to clear the course. If the result of the determination in step S222 is YES, the processing shifts to step S223, and if the result of this determination is NO, the processing returns to step S221.

In step S233, the processor 81 performs a course clearing representation in the normal mode (see FIG. 20). Then, the processing shifts to step S224.

In step S224, the processor 81 performs a display showing that the player character reaching the goal (clearing the course) exits the stage as described with reference to FIG. 20. Then, the processing returns to step S100 in FIG. 22.

If the result of the determination in step S208 is YES, in step S230, the processor 81 stops the race display and performs a race result display and a selection display as described with reference to FIG. 19. Then, the processing shifts to step S231.

In step S231, the processor 81 determines whether or not "Continue" has been selected by the player as described with reference to FIG. 19. If the result of the determination in step S231 is YES, the processing returns to step S221 and the game continues in the normal mode, and if the result of this determination is NO, the processing shifts to step S232.

In step S232, the processor 81 determines whether or not "Exit Course" has been selected by the player as described with reference to FIG. 19. If the result of the determination in step S232 is YES, the processing shifts to step S233, and if the result of this determination is NO, the processing returns to step S231.

In step S233, the processor 81 ends the stage as described with reference to FIG. 19. Then, the processing returns to step S100 in FIG. 22.

As described above, according to the exemplary embodiment, when friends enter a stage and play the game, a race can be played as a result of performing an operation for entering the race at the start point of the stage (FIG. 8, etc.) (S201 to S210 in FIG. 24, FIG. 25), while, as a result of not performing such an operation, the normal game can be played without participating in the race (NO in S204, S221 to S223 in FIG. 24).

MODIFICATIONS

In the exemplary embodiment described above, the example in which multiplay partners are determined by each player selecting a stage to participate in on the stage selection screen has been given (FIG. 5, FIG. 6, etc.). However, the present disclosure is not limited thereto, and multiplay partners may be matched by a server or the like to determine the multiplay partners. In this case, friend matching, in which matching is performed such that players who are friends with each other can perform multiplay, and random matching, in which matching is performed such that random players can perform multiplay, may be performed, a race block may be placed in a stage (S202 in FIG. 24) in the friend matching, and no race block may be placed in the stage (S220 in FIG. 24) in the random matching.

In the exemplary embodiment described above, the race mode of competing for time to reach the goal has been exemplified as the type of race mode. However, the present disclosure is not limited thereto, and the type of race mode may be a race mode of competing for a score.

In the exemplary embodiment described above, the example in which entry into the race is allowed until the countdown for the start of the race starts (FIG. 10) has been given. However, the present disclosure is not limited thereto, and entry into the race may be allowed until the race starts (FIG. 11).

In the exemplary embodiment, a case in which a series of processes regarding the game processing are executed in a single game apparatus (main body apparatus 2) has been described. In another exemplary embodiment, the series of processes may be executed in an information processing system including a plurality of information processing apparatuses. For example, in an information processing system including a terminal-side apparatus and a server-side apparatus communicable with the terminal-side apparatus via a network, some of the series of processes above may be executed by the server-side apparatus. Further, in an information processing system including a terminal-side apparatus and a server-side apparatus communicable with the terminal-side apparatus via a network, major processes among the series of processes above may be executed by the server-side apparatus, and some of the processes may be executed in the terminal-side apparatus. Further, in the above information processing system, the system on the server side may be implemented by a plurality of information processing apparatuses, and processes that should be executed on the server side may be shared and executed by a plurality of information processing apparatuses. Further, a configuration of a so-called cloud gaming may be adopted. For example, a configuration may be adopted in which: the game apparatus (main body apparatus 2) sends operation data indicating operations performed by the user to a predetermined server; various game processes are executed in the server; and the execution result is streaming-distributed as a moving image/sound to the game apparatus (main body apparatus 2).

While the exemplary embodiment and the modifications have been described, the description thereof is in all aspects illustrative and not restrictive. It is to be understood that various other modifications and variations may be made to the exemplary embodiment and the modifications.

What is claimed is:

1. One or more non-transitory computer-readable storage media having stored therein programs that, when executed by one or more processors of a first game apparatus for performing a multiplayer game between the first game apparatus and a second game apparatus capable of communicating with the first game apparatus, cause the first game apparatus to perform operations comprising:

placing a first player character, a second player character, and a predetermined trigger object within a virtual space for a game stage;

starting a multiplayer game with the first player character and the second player character in the game stage;

controlling the first player character within the virtual space based on operation data provided by a user of the first game apparatus;

controlling the second player character within the virtual space based on operation data received from another computing system;

based on a determination that the first player character acts on the trigger object:

activating a timer, and synchronizing a state of the trigger object between at least the first game apparatus and the second game apparatus, based on a determination that the second player character acts on the trigger object while the timer is active, advancing the multiplayer game to a first mode in which the user of the first game apparatus and a user of the second game apparatus compete for a play result of the multiplayer game in the game stage; and based on the second player character not acting on the trigger object while the timer is active, advancing the multiplayer game to a second mode in which the user of the first game apparatus and the user of the second game apparatus do not compete for a play result of the multiplayer game in the game stage;

rendering, to a display device, images of the virtual space for the game stage based at least on control of the first player character, control of the second player character, and the state of the trigger object.

2. The storage media according to claim 1, wherein the programs cause the first game apparatus to perform the operations further comprising:

further placing, in the game stage, a third player character controlled to move based on operation data by a user of a third game apparatus matched with the first game apparatus and the second game apparatus via a network;

causing a player character acting on the trigger object within a time period that the timer is active to play in the first mode; and causing a player character not acting on the trigger object within the time period that the timer is active to play in the second mode.

3. The storage media according to claim 1, wherein the programs cause the first game apparatus to perform the operations further comprising causing a player character acting on the trigger object to be unable to move out of a predetermined region in the game stage until a time period that the timer is active has elapsed.

4. The storage media according to claim 3, wherein the programs cause the first game apparatus to perform the operations further comprising causing the player character acting on the trigger object to be unable to move out of the predetermined region by locking scrolling display of a screen of the game stage.

5. The storage media according to claim 1, wherein the programs cause the first game apparatus to perform the operations further comprising, after any player character clears the game stage in the first mode and then a second time elapses, ending the first mode even if another player character has not cleared the game stage.

6. The storage media according to claim 5, wherein the programs cause the first game apparatus to perform the operations further comprising causing the user of the player character which has not cleared the game stage when the first mode is ended to select whether to continue to play the game in the second mode or end playing the game.

7. The storage media according to claim 1, wherein the matching includes friend matching performed between users who are friends with each other and random matching performed between random users, and the programs cause the first game apparatus to perform the operations further comprising placing the trigger object in the game stage only when the multiplayer game is played by users matched by the friend matching.

8. A game processing system for performing a multiplayer game between a first game apparatus and a second game apparatus capable of communicating with the first game apparatus, the game processing system comprising:

one or more processors and a memory coupled thereto, the one or more processors being configured to control the game processing system to perform operations comprising at least:

placing a first player character, a second player character, and a predetermined trigger object within a virtual space for a game stage;

starting a multiplayer game with the first player character and the second player character in the game stage;

controlling the first player character within the virtual space based on operation data provided by a user of the first game apparatus;

controlling the second player character within the virtual space based on operation data received from another computing system;

based on a determination that the first player character acts on the trigger object;

activating a timer, and synchronizing a state of the trigger object between at least the first game apparatus and the second game apparatus, based on a determination that the second player character acts on the trigger object while the timer is active, advancing the multiplayer game to a first mode in which the user of the first game apparatus and a user of the second game apparatus compete for a play result of the multiplayer game in the game stage;

based on the second player character not acting on the trigger object while the timer is active, advancing the multiplayer game to a second mode in which the user of the first game apparatus and the user of the second game apparatus do not compete for a play result of the multiplayer game in the game stage; and rendering, to a display device, images of the virtual space for the game stage based at least on control of the first player character, control of the second player character, and the state of the trigger object.

9. The game processing system according to claim 8, wherein the one or more processors are configured to control the game processing system to perform the operations comprising:

further placing, in the game stage, a third player character controlled to move based on operation data by a user of a third game apparatus matched with the first game apparatus and the second game apparatus via a network;

causing a player character acting on the trigger object within a time period that the timer is active time to play in the first mode; and causing a player character not acting on the trigger object within the time period that the timer is active to play in the second mode.

10. The game processing system according to claim 8, wherein the one or more processors are configured to control the game processing system to perform the operations comprising causing a player character acting on the trigger object to be unable to move out of a predetermined region in the game stage until the time period that the timer is active elapses.

11. The game processing system according to claim 10, wherein the one or more processors are configured to control the game processing system to perform the operations comprising causing the player character acting on the trigger object to be unable to move out of the predetermined region by locking scrolling display of a screen of the game stage.

12. The game processing system according to claim 8, wherein the one or more processors are configured to control the game processing system to perform the operations comprising, after any player character clears the game stage in the first mode and then a second time elapses, ending the first mode even if another player character has not cleared the game stage.

13. The game processing system according to claim 12, wherein the one or more processors are configured to control the game processing system to perform the operations comprising causing the user of the player character which has not cleared the game stage when the first mode is ended to select whether to continue to play the game in the second mode or end playing the game.

14. The game processing system according to claim 8, wherein the matching includes friend matching performed between users who are friends with each other and random matching performed between random users, and the one or more processors are configured to control the game processing system to perform the operations comprising placing the trigger object in the game stage only when the multiplayer game is played by users matched by the friend matching.

15. The game processing system of claim 8, wherein a state of the game stage is not synchronized during the multiplayer game.

16. The game processing system of claim 15, wherein, during the multiplayer game, a state of at least one object within the virtual space other than the trigger object is not synchronized between the first game apparatus and the second game apparatus.

17. A game processing method executed by one or more processors of a game processing system, the method comprising:

communicating, as part of a multiplayer game, between a first game apparatus and a second game apparatus;

placing a first player character, a second player character, and a predetermined trigger object within a virtual space for a game stage;

starting a multiplayer game with the first player character and the second player character in the game stage;

controlling the first player character within the virtual space based on operation data provided by a user of the first game apparatus;

controlling the second player character within the virtual space based on operation data received from another computing system;

based on a determination that the first player character acts on the trigger object:

activating a timer, and synchronizing a state of the trigger object between at least the first game apparatus and the second game apparatus:

based on a determination that the second player character acts on the trigger object while the timer is active, advancing the multiplayer game to a first mode in which the user of the first game apparatus and a user of the second game apparatus compete for a play result of the multiplayer game in the game stage;

based on the second player character not acting on the trigger object while the timer is active, advancing the multiplayer game to a second mode in which the user of the first game apparatus and the user of the second game apparatus do not compete for a play result of the multiplayer game in the game stage; and rendering, to a display device, images of the virtual space for the game stage based at least on control of the first player character, control of the second player character, and the state of the trigger object.

18. The game processing method according to claim 17, further comprising:

further placing, in the game stage, a third player character controlled to move based on operation data by a user of a third game apparatus matched with the first game apparatus and the second game apparatus via a network;

causing a player character acting on the trigger object within a time period that the timer is active to play in the first mode; and causing a player character not acting on the trigger object within the time period that the timer is active to play in the second mode.

19. The game processing method according to claim 17, further comprising causing a player character acting on the trigger object to be unable to move out of a predetermined region in the game stage until a time period that the timer is active has elapsed.

20. The game processing method according to claim 19, further comprising causing the player character acting on the trigger object to be unable to move out of the predetermined region by locking scrolling display of a screen of the game stage.

21. The game processing method according to claim 17, further comprising after any player character clears the game stage in the first mode and then a second time elapses, ending the first mode even if another player character has not cleared the game stage.

22. The game processing method according to claim 21, further comprising causing the user of the player character which has not cleared the game stage when the first mode is ended to select whether to continue to play the game in the second mode or end playing the game.

23. The game processing method according to claim 17, wherein the matching includes friend matching performed between users who are friends with each other and random matching performed between random users, and the method further comprises placing the trigger object in the game stage only when the multiplayer game is played by users matched by the friend matching.

* * * * *